US012035118B2

(12) United States Patent
Thompson et al.

(10) Patent No.: US 12,035,118 B2
(45) Date of Patent: Jul. 9, 2024

(54) METHOD OF PROVIDING AUDIO IN A VEHICLE, AND AN AUDIO APPARATUS FOR A VEHICLE

(71) Applicant: Tymphany Worldwide Enterprises Limited, Grand Cayman (KY)

(72) Inventors: James Meredith Thompson, Grand Cayman (KY); Thilo Christian Stompler, Grand Cayman (KY); Gavin Jones, Grand Cayman (KY); John Evan Bunner, Grand Cayman (KY)

(73) Assignee: Tymphany Worldwide Enterprises Limited, Grand Cayman (KY)

( * ) Notice: Subject to any disclaimer, the term of this patent is extended or adjusted under 35 U.S.C. 154(b) by 202 days.

(21) Appl. No.: 17/470,869

(22) Filed: Sep. 9, 2021

(65) Prior Publication Data
US 2022/0078569 A1  Mar. 10, 2022

Related U.S. Application Data

(60) Provisional application No. 63/076,132, filed on Sep. 9, 2020.

(51) Int. Cl.
*H04R 5/02* (2006.01)
*B60R 11/02* (2006.01)
(Continued)

(52) U.S. Cl.
CPC ............ *H04R 5/02* (2013.01); *B60R 11/0217* (2013.01); *H04R 1/403* (2013.01); *H04R 3/12* (2013.01);
(Continued)

(58) Field of Classification Search
None
See application file for complete search history.

(56) References Cited

U.S. PATENT DOCUMENTS 10,150,425 B1 * 12/2018 Scalisi ................. H04R 1/323
10,440,455 B2 * 10/2019 Fox ................... G10K 11/17823
(Continued)

FOREIGN PATENT DOCUMENTS

JP  WO-2019139103 A1 *  7/2019  ............... H04R 1/02
WO  WO-2019130282 A1 *  7/2019  ......... G10L 21/0216

OTHER PUBLICATIONS

WO2019/139103, English translation, Acoustic Device, 17 pages, publication date Jul. 18, 2019, Hayashi, Shigetoshi (Year: 2019).*
(Continued)

*Primary Examiner* — Duc Nguyen
*Assistant Examiner* — Assad Mohammed
(74) *Attorney, Agent, or Firm* — Finnegan, Henderson, Farabow, Garrett & Dunner, LLP

(57) ABSTRACT

A method for providing audio in a vehicle includes: providing a plurality of audio channels comprising a first audio channel and a second audio channel; processing, by an audio signal processing system, each audio channel of said plurality of audio channels to establish a principal signal and an accommodating signal for each audio channel of said plurality of audio channels; supplying said principal signal of said first audio channel to a forward loudspeaker of a loudspeaker pair and supplying said accommodating signal of said first audio channel to a backward loudspeaker of the loudspeaker pair to generate a forward directional radiation pattern based on said first audio channel; supplying said principal signal of said second audio channel to said backward loudspeaker of said loudspeaker pair and supplying said accommodating signal of said second audio channel to said forward loudspeaker of said loudspeaker pair to generate a backward directional radiation pattern based on said second audio channel; and guiding one or both of said forward directional radiation pattern and said backward
(Continued)

directional radiation pattern to one or more locations in said vehicle.

31 Claims, 8 Drawing Sheets

(51) Int. Cl.
    *H04R 1/40*     (2006.01)
    *H04R 3/12*     (2006.01)
    *H04R 5/04*     (2006.01)
    *H04S 1/00*     (2006.01)

(52) U.S. Cl.
    CPC ............... *H04R 5/04* (2013.01); *H04S 1/002* (2013.01); *H04R 2499/13* (2013.01); *H04S 2400/01* (2013.01)

(56) References Cited

U.S. PATENT DOCUMENTS

| | | | | |
|---|---|---|---|---|
| 2003/0021433 A1* | 1/2003 | Lee | .......................... | H04R 5/02 381/86 |
| 2005/0115762 A1* | 6/2005 | Ito | .......................... | H04R 1/2865 181/166 |
| 2005/0226440 A1* | 10/2005 | Lewiner | ................. | H04R 27/00 381/98 |
| 2009/0313028 A1* | 12/2009 | Tammi | .................. | G10L 19/265 704/500 |
| 2012/0051565 A1* | 3/2012 | Iwata | ...................... | H04S 3/002 381/300 |
| 2013/0140862 A1* | 6/2013 | Silzle | ..................... | H04R 1/323 297/217.5 |
| 2016/0205479 A1* | 7/2016 | Tomar | .................... | H04R 9/063 381/398 |
| 2017/0134837 A1* | 5/2017 | Rosen | .................... | H04R 5/023 |
| 2017/0213541 A1* | 7/2017 | MacNeille | ....... | G10K 11/17881 |
| 2018/0007466 A1* | 1/2018 | Hess | ....................... | H04R 1/345 |
| 2019/0039492 A1* | 2/2019 | Von Saint-George | ...................... | B60R 11/0217 |

OTHER PUBLICATIONS

WO2019/139103, English Translation, Acoustic Device, 17 Pages, Publication date Jul. 18, 2019, Hayashi, Shigetoshi (Year:2019) (Year: 2019).*

* cited by examiner

मेथड OF PROVIDING AUDIO IN A
VEHICLE, AND AN AUDIO APPARATUS FOR
A VEHICLE

METHOD OF PROVIDING AUDIO IN A VEHICLE, AND AN AUDIO APPARATUS FOR A VEHICLE

The present application claims the benefit of priority to U.S. Provisional Application No. 63/076,132 filed on Sep. 9, 2020, the contents of which are incorporated herein by reference.

TECHNICAL FIELD

The disclosed embodiments relate to methods and apparatus for providing audio in a vehicle. The disclosed embodiments further include a vehicle comprising an audio apparatus and an automobile with an audio system.

BACKGROUND

Many audio systems for vehicles are designed to provide an immersive audio experience to occupants of the vehicle. Early vehicle audio systems had just a single speaker and then stereo systems were introduced with two speakers, typically one mounted to each front door. More recently it has become common for vehicles to have a plurality of speakers, and perhaps one or more sub-woofers distributed throughout the vehicle in order to provide a more immersive experience, and to provide multi-channel audio. While the immersive qualities of audio systems for vehicles has improved, opportunities remain for further enhancing the immersive qualities of vehicle audio systems and simplifying manufacturability and installation of these systems.

The disclosed embodiments are directed to improvements in one or more of these (or other) areas.

SUMMARY

A method for providing audio in a vehicle includes: providing a plurality of audio channels comprising a first audio channel and a second audio channel; processing, by an audio signal processing system, each audio channel of said plurality of audio channels to establish a principal signal and an accommodating signal for each audio channel of said plurality of audio channels; supplying said principal signal of said first audio channel to a forward loudspeaker of a loudspeaker pair and supplying said accommodating signal of said first audio channel to a backward loudspeaker of the loudspeaker pair to generate a forward directional radiation pattern based on said first audio channel; supplying said principal signal of said second audio channel to said backward loudspeaker of said loudspeaker pair and supplying said accommodating signal of said second audio channel to said forward loudspeaker of said loudspeaker pair to generate a backward directional radiation pattern based on said second audio channel; and guiding one or both of said forward directional radiation pattern and said backward directional radiation pattern to one or more locations in said vehicle.

An audio apparatus for a vehicle includes an audio signal processing system arranged to process a plurality of audio channels and establish a principal signal and an accommodating signal for each of the plurality of audio channels; one or more loudspeaker pairs, wherein each of the one or more loudspeaker pairs includes a forward loudspeaker and a backward loudspeaker, and wherein each of said one or more loudspeaker pairs is configured to be communicatively coupled to two respective audio channels among said plurality of audio channels, wherein for each of said one or more loudspeaker pairs: said forward loudspeaker of the one or more loudspeaker pairs is coupled to said principal signal of a first of said two respective audio channels and coupled to said accommodating signal of a second of said two respective audio channels, and said backward loudspeaker of the one or more loudspeaker pairs is coupled to said principal signal of said second of said two respective audio channels and coupled to said accommodating signal of said first of said two respective audio channels; such that each of the one or more loudspeaker pairs simultaneously generates a forward directional radiation pattern based on said first of said two respective audio channels, and a backward directional radiation pattern based on said second of said two respective audio channels.

In an exemplary embodiment, the loudspeaker pair is installed in a dashboard of an automobile with the two loudspeakers facing in opposite directions. From here, it may provide audio to one or more occupants of the vehicle, e.g., a driver and a passenger in the front seat. Each audio channel carries an audio signal upon which an accommodating and a principal signal is established. The accommodating signal may for example be generated based on the principal signal, e.g., by applying a combination of a delay, signal inversion, and a low-pass-filter to the principal signal. For each of the two audio channels, these two signals are supplied to opposite loudspeakers of the pair to generate a directional radiation pattern. This is implemented through supplying the principal signal of the first audio channel and the accommodating signal of the second audio channel to one of the loudspeakers, and the accommodating signal of the first audio channel and the principal signal of the second audio channel to the other loudspeaker. The two resulting directional radiation patterns are guided to one or more occupant locations in the automobile. An occupant location may for example include a driver seat, a passenger seat, or any other seat suitable for seating an occupant in the vehicle. The guidance of the directional radiation patterns may be implemented by one or more waveguides, or by reflection, e.g., from a windscreen of the automobile, the inside surface of the roof, a headliner, or some other surface. The two directional radiation patterns may then for example be guided to different locations, for example the positions where two separate occupants of the vehicle sit. Alternatively, in other embodiments, the two directional radiation patterns are guided to a single occupant, for example such that this occupant receives stereo sound.

The directional audio output of the loudspeaker pair may allow the two loudspeakers to be located closely together. In contrast to a classical stereo loudspeaker system, this may allow a more compact loudspeaker apparatus.

The disclosed embodiments may include two loudspeakers to generate two directional radiation patterns, in comparison with using two loudspeakers to only generate a single directional radiation pattern.

Directional radiation patterns may allow audio to primarily be guided to single occupant locations, thus minimizing undesired sound at other occupant locations.

Providing multi-channel audio using one or more loudspeaker pairs may be advantageous in vehicles, because the loudspeaker pairs may utilize the predetermined acoustic environment provided by the inside of the vehicle and may utilize the predetermined occupant locations of the vehicle. The acoustic environment of a vehicle is predetermined at the production stage of the vehicle. An audio system can thus be particularly well tailored for a vehicle, in contrast to an audio system suitable for other environments (e.g., home audio systems, etc.). The predetermined acoustic environment of a vehicle may for example be used to guide or reflect a sound signal for improved personalized audio. The predetermined occupant locations may for example include car seats in an automobile, and these predetermined potential locations may provide fixed targets for the audio, enabling improved directed audio.

DETAILED DESCRIPTION

Figure 1:
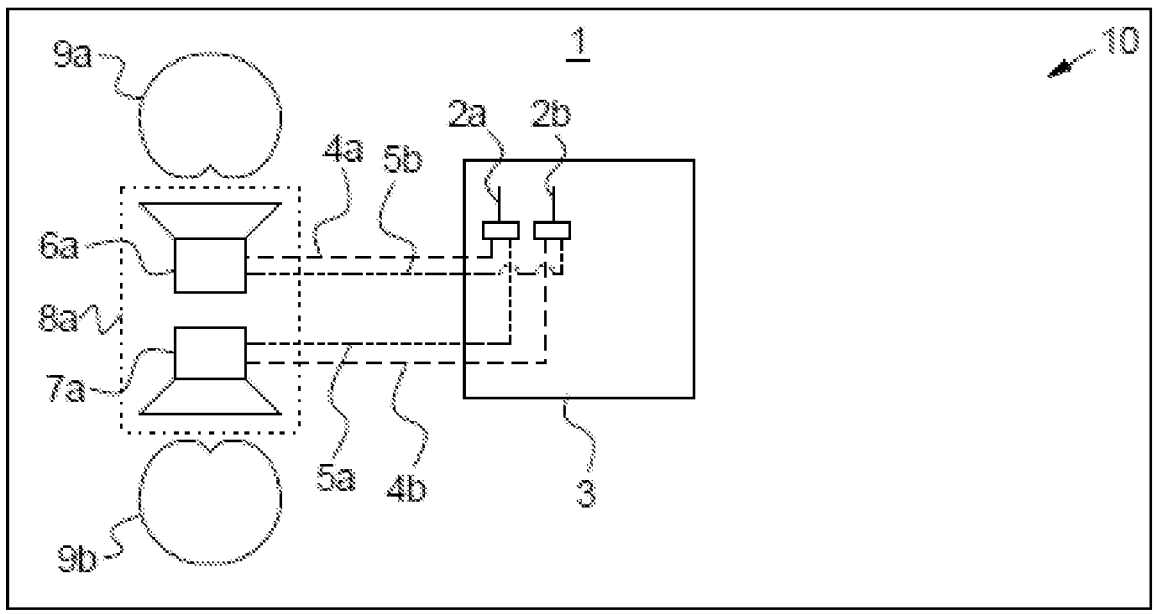
FIG. 1 illustrates an audio system with one loudspeaker pair, according to exemplary disclosed embodiments.

FIG. 1 illustrates an embodiment with one loudspeaker pair 8a. The embodiment includes a personalized audio apparatus 10 configured to provide personalized audio in a vehicle 1. The apparatus 10 comprises an audio signal processing system 3, which may for example be implemented by one or more digital signal processors. A first audio channel 2a and a second audio channel 2b are provided within audio signal processing system 3. The first audio channel 2a is processed to generate a first principal signal 4a and a first accommodating signal 5a. Similarly, the second audio channel 2b is processed to generate a second principal signal 4b and a second accommodating signal 5b. The first principal signal 4a and the second accommodating signal 5b are supplied to a forward loudspeaker 6a of a loudspeaker pair 8a, and the second principal signal 4b and the first accommodating signal 5a are supplied to a backward loudspeaker 7a of that loudspeaker pair 8a.

For each of the audio channels, the associated principal and accommodating signals are generated to establish a directional radiation pattern based on the relevant audio channel upon supplying these signals to a loudspeaker pair. Establishing or generating a directional radiation pattern, e.g., a radiation pattern which has a larger intensity in one general direction than in an opposite direction, may depend on both the geometrical configuration of the loudspeaker pair as well as the supplied signals. Here, the principal and accommodating signal may for example be similar signals, but with a relative phase shift to each other. Both signals may further resemble an audio signal carried in an associate audio channel. To promote directionality, the magnitude of the relative phase shift may depend on the distance between the two loudspeakers of the pair and the frequencies carried by the signals. The processing to generate the accommodating signal may for example include a delay and signal inversion. Further, one or more filters, such as band-pass filters, low pass or high pass filters, etc. may be used to process one or more isolated frequency bands.

Supplying the first principal signal 4a to the forward loudspeaker 6a and the first accommodating signal 5a to the backward loudspeaker 7a results in the generation of a forward directional radiation pattern 9a. Similarly, supplying the second principal signal 4b to the backward loudspeaker 7a and the second accommodating signal 5b to the forward loudspeaker 6a results in the generation of a backward directional radiation pattern 9b. The forward directional radiation pattern 9a is based on the first audio channel 2a. For example, an audio signal carried by the first audio channel 2a may be approximately reproduced in the forward directional radiation pattern 9a, via an intermediate stage of being transmitted as an accommodating signal 5a and a principal signal 4a. Similarly, the backward directional radiation pattern 9b is based on the second audio channel 2b.

The directional radiation patterns 9a, 9b are emitted from the loudspeaker pair 8a in substantially opposite directions, for example such that they can be guided substantially to separate locations in the vehicle (e.g., separate occupant locations) or such that they can be guided substantially to a common location (e.g., a single occupant location) to provide stereo sound to that location.

Depending on the purpose of the audio system, the audio signals in the audio channels can be selected accordingly. For example, if two directional radiation patterns provide stereo sound to an occupant location, then the two audio channels may each carry one of the signals of the stereo sound. Alternatively, if the two directional radiation patterns are intended for providing different audio to two different occupant locations, e.g. music to one occupant location and telecommunication audio to another occupant location, then the two audio channels may respectively carry a music audio signal and telecommunication audio signal. Although a vehicle is a reflective environment, so that the two channels will both transmit to some extent to each occupant, the system may supply one signal (e.g., telecommunication audio) more prominently to a first occupant as compared to a second occupant. As a result, the supplied signal may be perceived more loudly by the first occupant than by the second occupant.

Figure 2A:
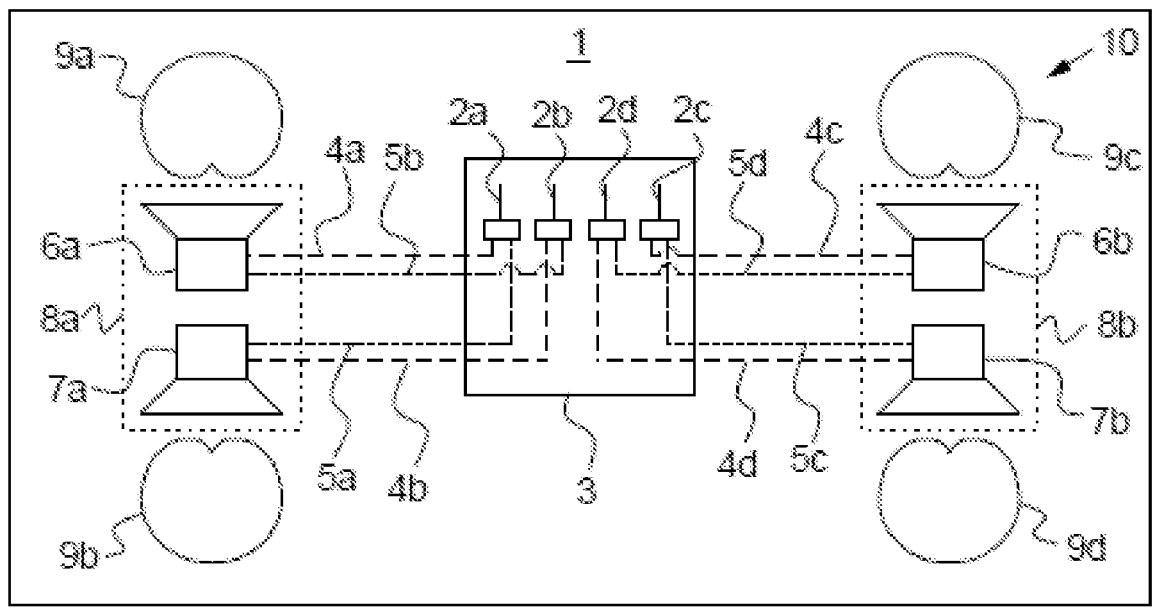
FIG. 2a illustrates an audio system with two loudspeaker pairs, according to exemplary disclosed embodiments.

FIG. 2a illustrates an embodiment with two loudspeaker pairs 8a, 8b. The embodiment is an audio apparatus 10 configured to provide audio in a vehicle 1. Similar to the embodiment illustrated in FIG. 1, audio apparatus 10 is arranged to generate two directional radiation patterns 9a, 9b based on a first audio channel 2a and a second audio channel 2b and via an intermediate stage of principal signals 4a, 4b and accommodating signals 5a, 5b.

Further, the embodiment illustrated in FIG. 2a comprises a second loudspeaker pair 8b. The audio signal processing system 3 is arranged to process a third audio channel 2c to generate a third principal signal 4c and a third accommodating signal 5c, and to process a fourth audio channel 2d to generate a fourth principal signal 4d and a fourth accommodating signal 5d. These principal and accommodating signals 4c, 4d, 5c, 5d may be established by similar procedures as those taken to establish the first and second principal and accommodating signals 4a, 4b, 5a, 5b. The third principal signal 4c and the fourth accommodating signal 5d are supplied to a forward loudspeaker 6b of the second loudspeaker pair 8b, and similarly, the fourth principal signal 4*d* and the third accommodating signal 5*c* are supplied to a backward loudspeaker 7*b* of the second loudspeaker pair 8*b*. Consequently, a second forward directional radiation pattern 9*c* and a second backward radiation pattern 9*d* are generated.

Regarding the embodiment of FIG. 2*a*, accommodating signals can be combined to reduce the number of channels needed. For example, first accommodating signal 5*a* and third accommodation signal 5*c* could be combined (mixed together in the DSP 3) and supplied to both forward loudspeaker 7*a* and backward loudspeaker 7*b* simultaneously in the sense of a 'mono' signal. Such combining can allow for generation of desired radiation patterns 9*a* and 9*c* while potentially reducing the number of channels needed depending on desired radiation pattern requirements.

Audio apparatus 10 can provide four different directional audio patterns 9*a*, 9*b*, 9*c*, 9*d* based on four different audio channels 2*a*, 2*b*, 2*c*, 2*d*. The audio may for example be provided to four different occupant locations or be used to provide stereo audio to two occupant locations. Accordingly, the audio signals of the audio channels can be generated to suit the needs of an intended purpose.

Figure 2B:
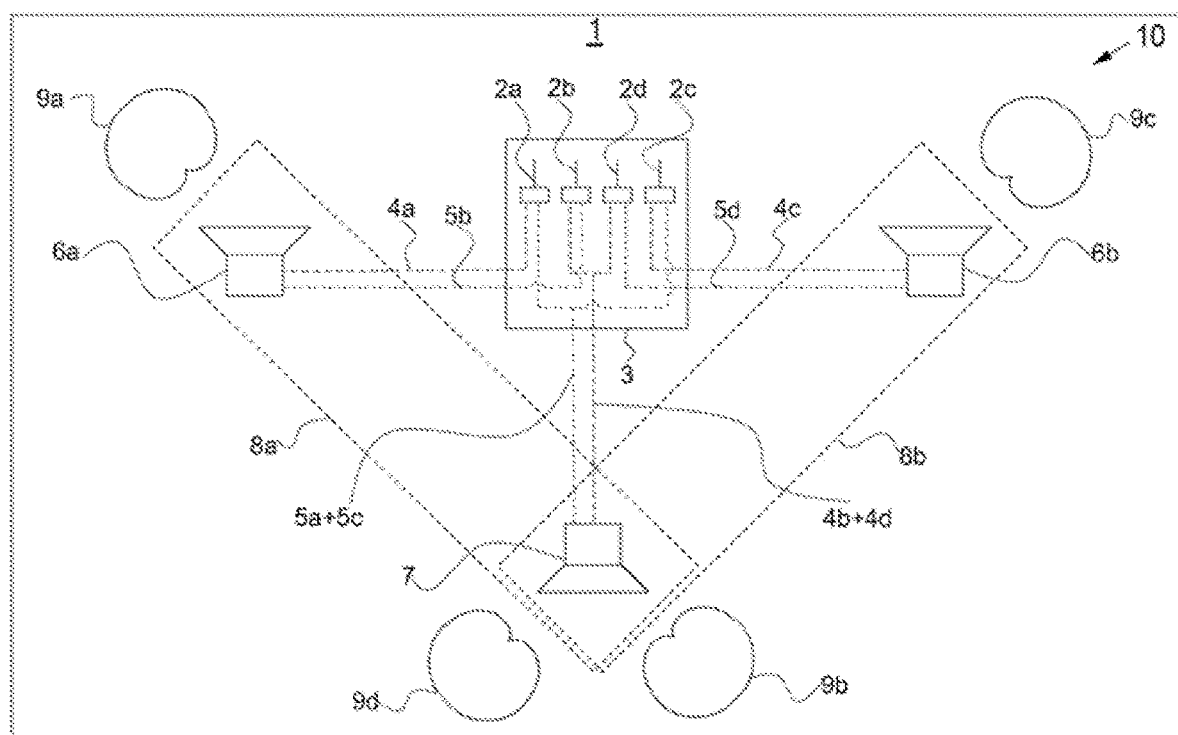
FIG. 2b illustrates an embodiment with two loudspeaker pairs, where one loudspeaker is common to both loudspeaker pairs.

The embodiment of FIG. 2*b* can operate similarly to the apparatus of FIG. 2*a*, but in this case a single backward loudspeaker 7 is used to reproduce the principal signals 4*b* and 4*d* and also the accommodating signals 5*a* and 5*c*. In this case these signals are combined inside the DSP 3. The embodiment of FIG. 2*b* therefore illustrates an embodiment of the invention with two loudspeaker pairs, where one loudspeaker is included as the second loudspeaker in more than one pair. In this way the apparatus 10 in FIG. 2*b* can provide four different directional audio patterns 9*a*, 9*b*, 9*c*, 9*d* based on four different audio channels 2*a*, 2*b*, 2*c*, 2*d*. The audio may for example be provided to four different occupant locations or be used to provide stereo audio to two occupant locations. Accordingly, the audio signals of the audio channels may match the intended purpose.

Figure 3A:
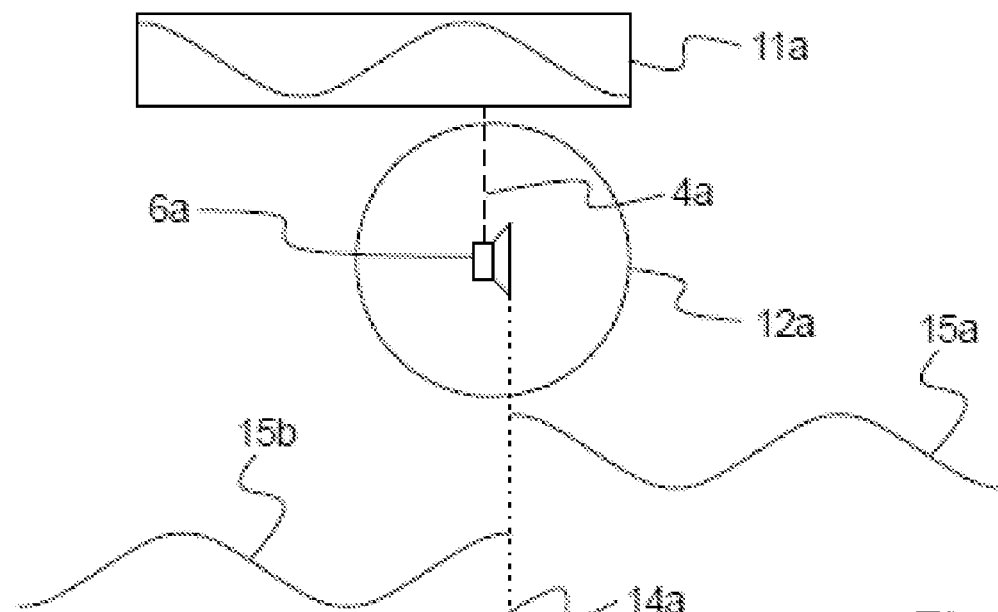
FIG. 3a-b illustrate exemplary generation of a directional radiation pattern, in contrast to generation of an isotropic radiation pattern.
Figure 3B:
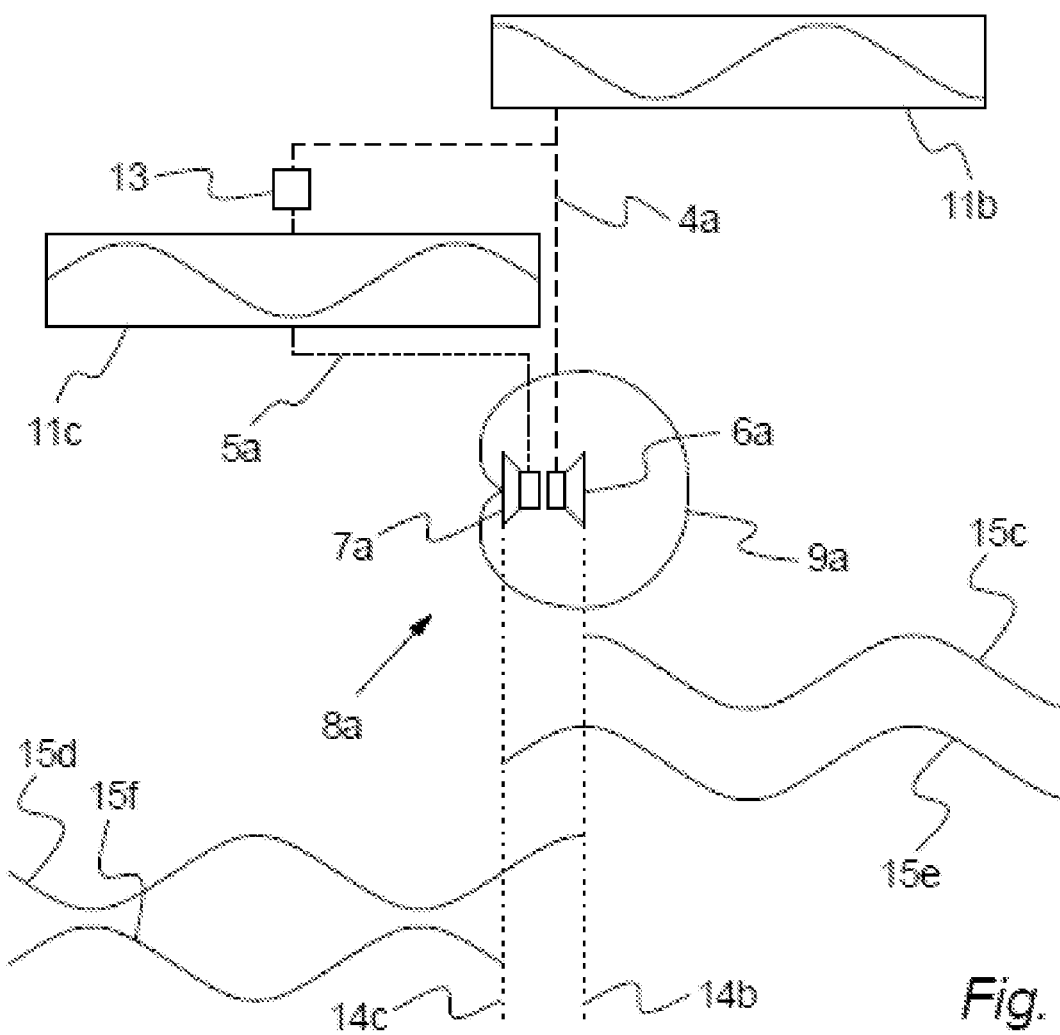

FIGS. 3*a*-*b* illustrate exemplary generation of a directional radiation pattern, in contrast to generation of an isotropic radiation pattern. Namely, FIG. 3*a* illustrates a single loudspeaker 6*a* receiving a single signal 4*a* to generate an approximately isotropic radiation pattern 12*a*, whereas FIG. 3*b* illustrates a loudspeaker pair 8*a* receiving a principal signal 4*a* and an accommodating signal 5*a* to generate a directional radiation pattern 9*a*. Both illustrations are accompanied by exemplary sound propagation signals 15*a*-15*f*, which represent waves interfering constructively and destructively.

In FIG. 3*a*, a single (forward) loudspeaker 6*a* receives a single (principal) signal 4*a*. The signal 4*a* has an associated audio signal representation 11*a*, which represents the audio signal value as a function of time in a limited time window. The audio signal representation 11*a* resembles a sinusoidal curve, and the signal 4*a* thus corresponds to a single tone. The signal 4*a* is supplied to the loudspeaker 6*a*, which reproduces the signal 4*a* as sound, as represented by two sound propagation signals 15*a*, 15*b* propagating in two directions relative to a loudspeaker propagation point 14*a*. The horizontal direction of the figure may thus be interpreted as a spatial axis on which the loudspeaker is located, such that sound may propagate in both directions of this axis. The two sound propagation signals 15*a*, 15*b* propagate in opposite directions (e.g., symmetrically) from the loudspeaker propagation point 14*a*. They may be mirrored due to the opposite propagation directions. The resulting radiation pattern 12*a* may be approximately isotropic, i.e., the sound has a similar intensity/sound pressure level profile in either direction from the loudspeaker propagation point. In practical terms, the loudspeaker propagation point may for example correspond to a diaphragm center of the loudspeaker 6*a*.

In FIG. 3*b*, a loudspeaker pair 8*a* receives both a principal signal 4*a* and an accommodating signal 5*a*. The principal signal 4*a* has an associated audio signal representation 11*b*, which represents the audio signal value as a function of time in a limited time window. Principal audio signal 4*a* resembles a sinusoidal curve. The principal signal is divided into to signal paths: one which transmits the signal directly to a forward loudspeaker 6*a*, and another which feeds the signal to a delay unit 13, which can impart a delay relative to the signal input to delay unit 13. The delay results in the establishment of an accommodating signal 5*a* shifted by a quarter of a period of the sinusoidal signal. Accordingly, the accommodating signal 5*a* has an associated audio signal representation 11*c*, which displays how the accommodating signal 5*a* is delayed compared to the principal signal 4*a* and its representation 11*b*. The delay further corresponds to a phase shift between the principal signal 4*a* and the accommodating signal 5*a*. The accommodating signal 5*a* is supplied to the backward loudspeaker 7*a* of the pair of loudspeakers 8*a*.

Thus, the forward loudspeaker 6*a* receives a principal signal 4*a*, and the backward loudspeaker 7*a* receives an accommodating signal 5*a*. Each of the loudspeakers 6*a*, 7*a* reproduce its received signal as sound represented by sound propagation signals 15*c*, 15*d*, 15*e*, 15*f* propagating in both directions relative to loudspeaker propagation points 14*b*, 14*c* of the two respective loudspeakers 6*a*, 7*a*. The horizontal direction of the figure may again be interpreted as a spatial axis on which the loudspeakers are located, such that sound may propagate in both directions of this axis. Note that there is a distance between the two loudspeaker propagation points 14*b*, 14*c*. To generate a directional radiation pattern, signal processing may be matched with this distance.

The forward loudspeaker 6*a* symmetrically emits a sound propagation signal 15*c* to the right-hand side and another sound propagation signal 15*d* to the left-hand side relative to a loudspeaker propagation point 14*b*. The two signals 15*c*, 15*d* may be mirrors of one another due to opposite propagation directions. In a similar manner, the backward loudspeaker 7*a* can symmetrically emit a sound propagation signal 15*e* to the right-hand side and another sound propagation signal 15*f* to the left-hand side relative to a loudspeaker propagation point 14*c*.

The radiation pattern of the loudspeaker pair 8*a* is based on a superposition of the individual contributions of sound propagation signals 15*c*, 15*d*, 15*e*, 15*f* and may thus be subject to interference of these signals. To the right-hand side, a sound propagation signal 15*c* of the forward loudspeaker 6*a* and a sound propagation signal 15*e* of the backward loudspeaker 7*a* may interfere constructively. In contrast, to the left-hand side, a sound propagation signal 15*d* of the forward loudspeaker 6*a* and a sound propagation signal 15*f* of the backward loudspeaker 7*a* may interfere destructively. Destructive interference to the left-hand side and constructive interference to the right-hand side can result in a directional radiation pattern 9*a*.

As shown in FIG. 3*b*, radiation pattern 9*a* has a propagation direction to the right-hand side, its intensity to the right-hand side is larger than to its left-hand side, and an integration of the intensity to the right-hand side is larger than an integration of the intensity to the left-hand side.

The sections above describe one approach for generating a directional radiation pattern. Other approaches for generating a directional radiation pattern may also be employed. For example, additional processing may be used to generate a directional radiation pattern across a broad range of frequencies.

FIGS. 4a-d illustrate various exemplary loudspeaker configurations according to exemplary disclosed embodiments.

Figure 4A:
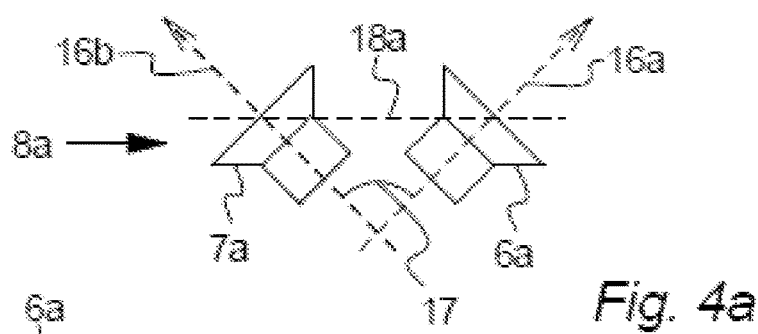
FIG. 4a-d illustrate various exemplary loudspeaker configurations, according to exemplary disclosed embodiments.
Figure 4B:
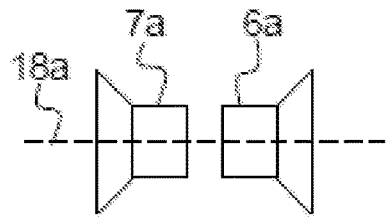
Figure 4C:
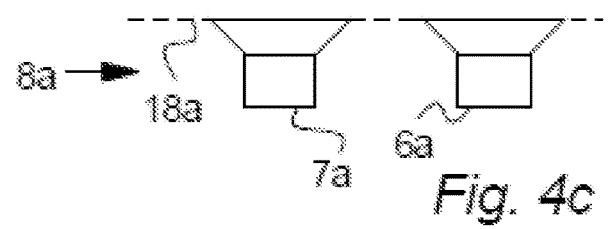

FIG. 4a-c each show a different configuration of two loudspeakers 6a, 7a of a loudspeaker pair 8a having a loudspeaker pair axis 18a. In FIG. 4a, the loudspeaker direction 16a, 16b of each of the loudspeakers 6a, 7a is shown. The loudspeaker pair axis 18a is a straight line through the diaphragm centers of the two loudspeakers 6a, 7a of the pair 8a. The loudspeaker direction 16a, 16b of each loudspeaker 6a, 7a may be determined as a straight line extending through the diaphragm center of the relevant loudspeaker, the straight line being parallel to a direction in which a voice coil of the loudspeaker is arranged to move upon receiving a driving signal. The loudspeaker direction of a loudspeaker may further point in the direction from the back of the loudspeaker to the front of the loudspeaker, as indicated by arrowheads of the loudspeaker directions 16a, 16b shown in FIG. 4a. The two illustrated loudspeaker directions 16, 16b define a loudspeaker angle 17, which for the illustrated loudspeaker pair 8a in FIG. 4a is approximately 90 degrees. For the loudspeaker pair illustrated in FIG. 4b, the loudspeaker angle is approximately 180 degrees, and for the loudspeaker pair illustrated in FIG. 4c, the loudspeaker angle is approximately 0 degrees.

Figure 4D:
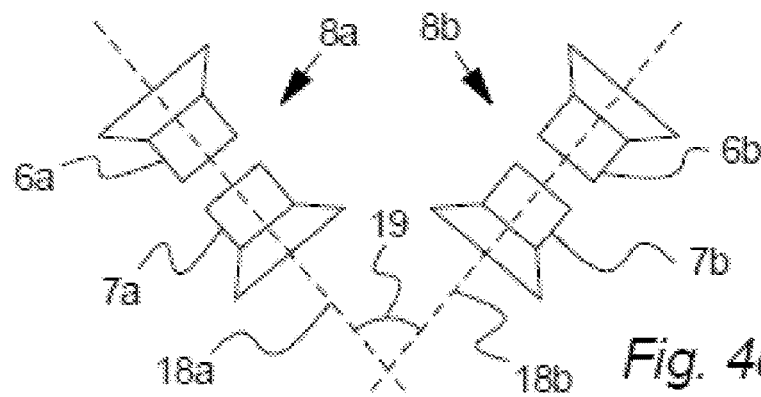

FIG. 4d illustrates two loudspeaker pairs 8a, 8b. A first loudspeaker pair 8a comprises a forward loudspeaker 6a and a backward loudspeaker 7a and has a loudspeaker pair axis 18a determined by the combined orientation of the loudspeaker pair 8a. Similarly, a second loudspeaker pair 8b comprises a forward loudspeaker 6b and a backward loudspeaker 7b and has a loudspeaker pair axis 18b determined by the combined orientation of the loudspeaker pair 8b. The two loudspeaker pair axes 18a, 18b have a loudspeaker pair angle 19. This loudspeaker pair angle 19 may for example be quantified by a dot product between two vectors parallel to the two loudspeaker pair axes 18a, 18b.

Figure 5:
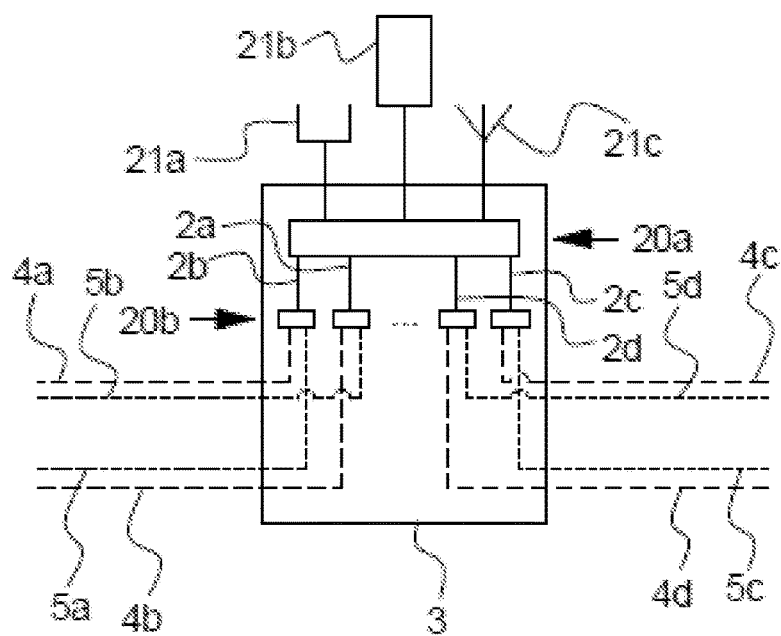
FIG. 5 illustrates an audio signal processing system, according to exemplary disclosed embodiments.

FIG. 5 illustrates an audio signal processing system 3. The audio signal processing system 3 may be similar to the audio signal processing system 3 illustrated in FIG. 2a, but may further include processing phases 20a, 20b and audio sources 21a, 21b, 21c.

The audio signal processing system 3 has three exemplary audio sources 21a, 21b, 21c. The first audio source 21a includes a stereo input, arranged to receive stereo audio. The input 21a may for example be arranged to connect to a stereo signal wirelessly and/or through a wired connection. A wired connection may for example be facilitated by a jack or minijack connection. A jack connector may also be referred to as a phone connector. A wireless connection may for example be facilitated by a Bluetooth connection, or a long-distance broadband network. The stereo input 21a may for example supply an audio signal, e.g., music, to the audio signal processing system 3.

The second audio source 21b includes a telecommunication unit for telecommunication. The telecommunication may for example be facilitated by a phone, such as a smartphone, or a computer. The telecommunication unit may then provide telecommunication audio, e.g., speech from a phone call, to the audio signal processing system 3, such that this audio can be provided.

The third audio source includes an antenna 21c, e.g., an antenna suitable for receiving an AM or FM radio signal. The antenna 21c may then provide any received audio signal to the audio signal processing system 3, such that this audio can be provided.

As the audio signal processing system 3 may be connected to several audio sources simultaneously, it may also facilitate selection of audio sources and distribution of audio sources onto audio channels 2a, 2b, 2c, 2d.

Selection of audio sources may be performed automatically by the audio signal processing system 3. For example, upon initiating a connection to the stereo input 21a, the audio signal processing system 3 automatically uses audio of the stereo input. Or upon receiving or accepting a phone call facilitated by the telecommunication unit 21b, the audio signal processing system 3 automatically uses telecommunication audio for audio directed primarily at one occupant. Note that the phone call will still generally be audible by other occupants, but generally at a lower volume than volume heard by the occupant it is directed at. Selection of audio sources may further be performed manually, e.g., by a user such as an occupant of the vehicle. For example, upon input from a user, the audio signal processing system may switch between or add an audio source 21a, 21b, 21c.

The audio signal processing system 3 further distributes any audio input onto the various available audio channels 2a, 2b, 2c, 2d in a first audio processing step 20a. It may for example provide audio to one or a few selected audio channels, e.g., if audio shall only be directed substantially to a single occupant location. Or it may for example provide audio to all the channels, if audio is to be supplied to more than one occupant location. One group of channels may receive one audio signal, whereas another group of audio channels may receive another audio signal. In this way, occupants in a vehicle may for example receive a combination of audio which is supplied to all occupants of the vehicle, and audio which is directed primarily to a one or some of the occupants (although in practice this may still be heard by other occupants). As such, any number of audio inputs may be distributed among the audio channels in various different combinations. This distribution may be controlled automatically by the audio signal processing system 3, or it may be controlled manually, e.g., based on input from a user.

When audio has been distributed among selected audio channels, the signal of each audio channel 2a, 2b, 2c, 2d is converted into a principal signal 4a, 4b, 4c, 4d and an accommodating signal 5a, 5b, 5c, 5d in a second processing step 20b. In this step 20b, one or more processing elements such as a delay, signal inversion, and filtering may, for example, be applied. Such processing elements may also be applied in the first processing step 20a. Further, in some embodiments of the embodiment, the two processing steps 21a, 20b may be performed in practice as a single step, or as more than two steps, e.g., three or four steps.

There is no limitation to the number audio channels. There may be two audio channels for each loudspeaker pair, for example, such that each loudspeaker pair is able to generate two directional radiation patterns. Alternatively, one or more loudspeaker pairs may have one associated audio channel, or an audio channel may be associated with a loudspeaker which is not a part of a pair. In principle, the invention can also be extended to generate directional radiation patterns from a group of loudspeakers with more than two loudspeakers. For example, three loudspeakers, four loudspeaker, or more than four loudspeakers may receive signals which are phase shifted relatively, to generate a directional radiation pattern. These phase-shifted signals may thus comprise at least a principal signal and an accommodating signal. Such groups of loudspeakers may for example be aligned in a type of array.

In some embodiments, pairs of loudspeakers are aligned in a phased array. In such a phased loudspeaker pair array, each loudspeaker pair may emit at least one directional radiation pattern, which is controlled or adjusted in phase, relatively to directional radiation patterns emitted by other loudspeaker pairs of the phased loudspeaker pair array. Directional radiation patterns which are controlled in phase relatively to each other may be used to improve directionality of the emitted radiation pattern and/or to generate localized regions of sound/audio within the vehicle, e.g., at an occupant location. Implementation of such phased loudspeaker pair arrays may also be performed using an audio signal processing system 3 as illustrated in FIG. 5. Here, the first processing step 20a may for example determine which audio is distributed to which audio channels 2a, 2b, 2c, 2d and what the relative phase shifts among audio channels 2a, 2b, 2c, 2d should be.

FIGS. 6a-f illustrate various exemplary radiation patterns. Each of the subfigures shows a polar coordinate system 22, used to illustrate radiation patterns. The angle relative to the origin corresponds to an angle relative to an audio radiation source, e.g., in the plane of the audio radiation source. An audio radiation source may for example be a loudspeaker or a loudspeaker pair. The distance from the origin of the coordinate system 22 corresponds to a sound pressure level or intensity of a given radiation pattern in a given direction. Typically, each grid line may for example correspond to a change of sound pressure level, e.g. a 10 dB change of sound pressure level. The downwards direction on the plots may for example be considered as corresponding to a forward direction of the audio radiation source, such as a forward direction of a loudspeaker or loudspeaker pair in the context of the present disclosure, and the upwards direction correspond to a backwards direction of a loudspeaker or loudspeaker pair in the context of the present disclosure.

Figure 6A:
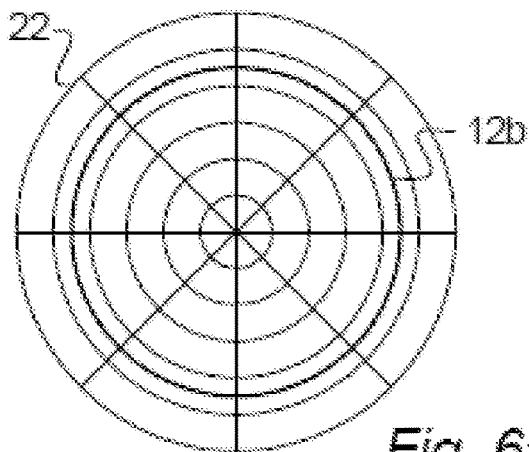
FIG. 6a-f illustrate various exemplary radiation patterns.

FIG. 6a illustrates a radiation pattern 12b, which is approximately isotropic. The sound pressure level does not change significantly with varying angle. Such a radiation pattern does not offer significant directional qualities.

Figure 6B:
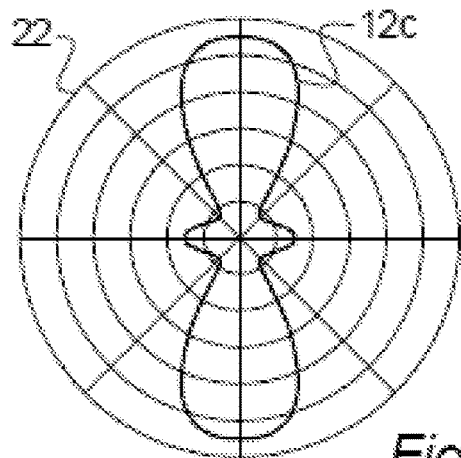

FIG. 6b illustrates a radiation pattern 12c, which is not isotropic. However, the sound pressure level in a downwards direction is similar to the sound pressure level in the upwards direction. Thus, in the context of the present disclosure, this radiation pattern 12c may not necessarily be considered a directional radiation pattern, as the radiation pattern in the forward (downward) direction is the same as the backwards (upward) direction.

Figure 6C:
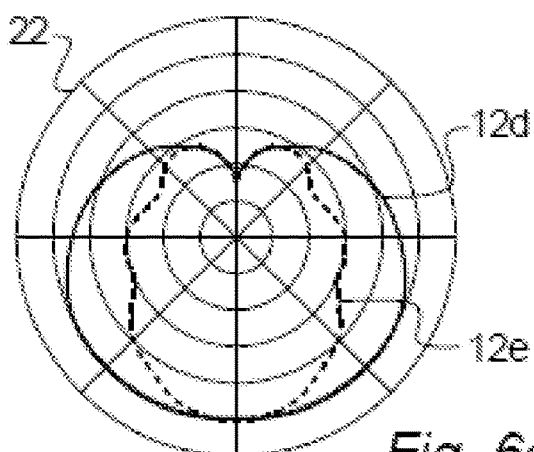

FIG. 6c illustrates two radiation pattern curves 12d-12e. These are an example of a vertical 12d and a horizontal 12e component of a directional radiation pattern, for example emitted from a disclosed loudspeaker pair. The horizontal and the vertical component of a directional radiation pattern do not necessarily need to be the same. Both components 12d, 12e display directionality in a downwards direction. This may be quantified, e.g., by integration of the sound pressure level around the bottom half of the polar coordinate system, or simply by reading the value of the sound pressure level in the downwards direction relative to the sound pressure level in the opposite direction.

Figure 6D:
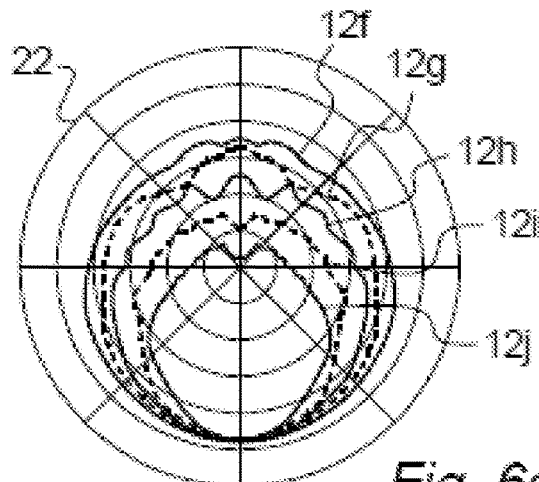

FIG. 6d illustrates five radiation pattern curves 12f-12j. These provide examples of how a directional radiation pattern from an audio source may vary with frequency. The outermost curve 12f is 500 Hz, the next curve 12g is 1 kHz, the next curve 12h is 2.5 kHz, the next curve 12i is 8 kHz, and the innermost curve 12j is 16 kHz. Variance with frequency as exemplified in FIG. 6d is common, particularly for directional radiation pattern. However, note that the directionality is maintained throughout the displayed frequency range. Directional radiation patterns from loudspeaker pairs according to the invention may typically also display variance with frequency.

Figure 6E:
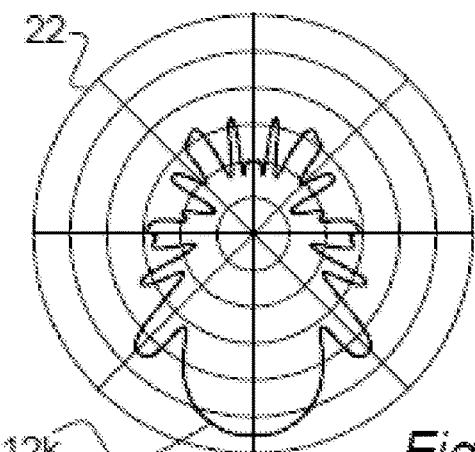

FIG. 6e illustrates a radiation pattern 12k, which has an irregular shape. Nevertheless, such a radiation pattern may be considered as a directional radiation pattern according to the invention, because the value of the sound pressure level in the downwards direction is larger relative to the sound pressure level in the opposite (upwards) direction.

Figure 6F:
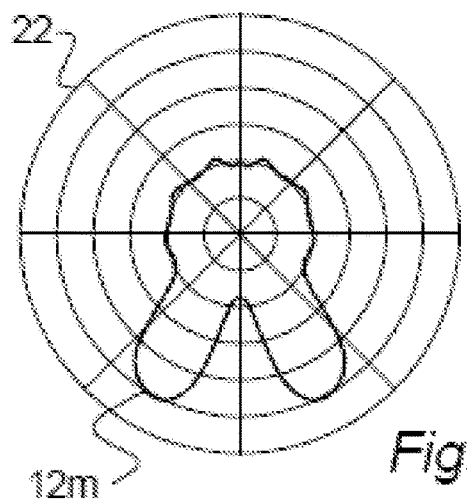

FIG. 6f illustrates a radiation pattern 12m, which displays acoustic lobing. Namely, the sound pressure level directly in the downwards direction is smaller relative to the sound pressure level in the upwards direction. However, in some embodiments, such a radiation pattern 12m may nevertheless be considered a directional radiation pattern, because an integration of the sound pressure level of the radiation pattern 12m in the bottom half of the polar coordinate system yields a larger value than an integration in the top half of the polar coordinate system.

Figure 7A:
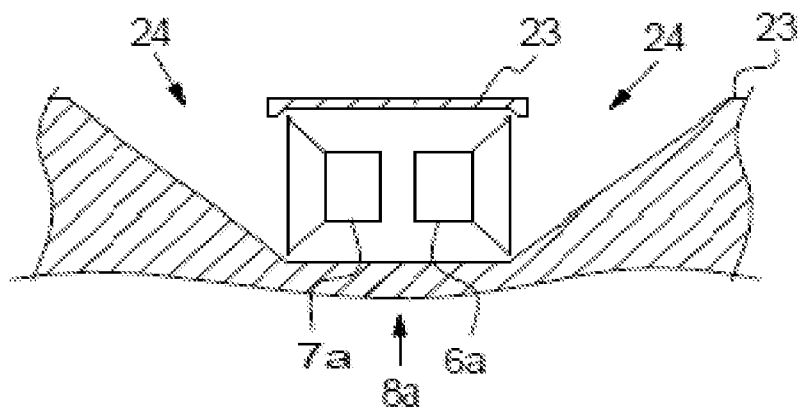
FIG. 7a-d illustrate integration of loudspeaker pairs into a dashboard of an automobile and exemplary guiding of directional radiation patterns, according to exemplary disclosed embodiments.
Figure 7B:
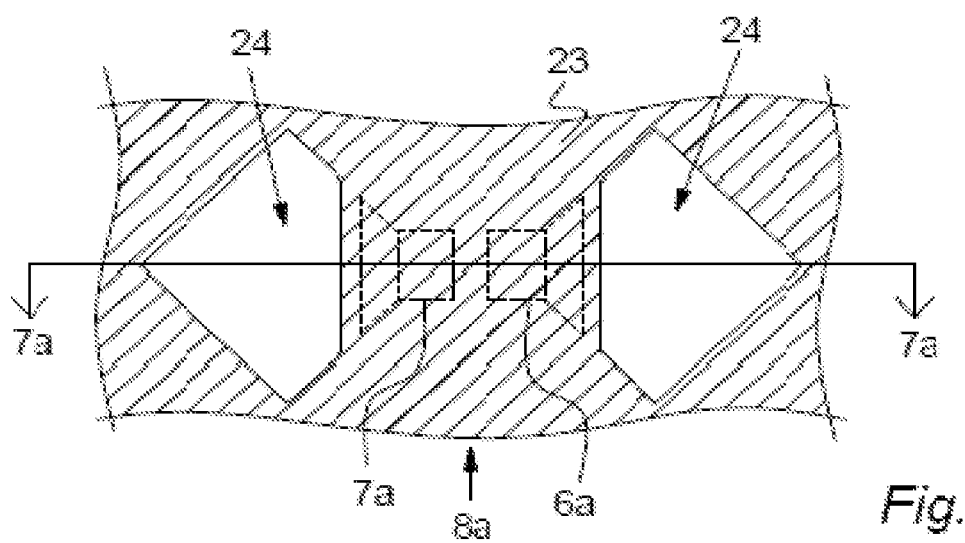
Figure 7C:
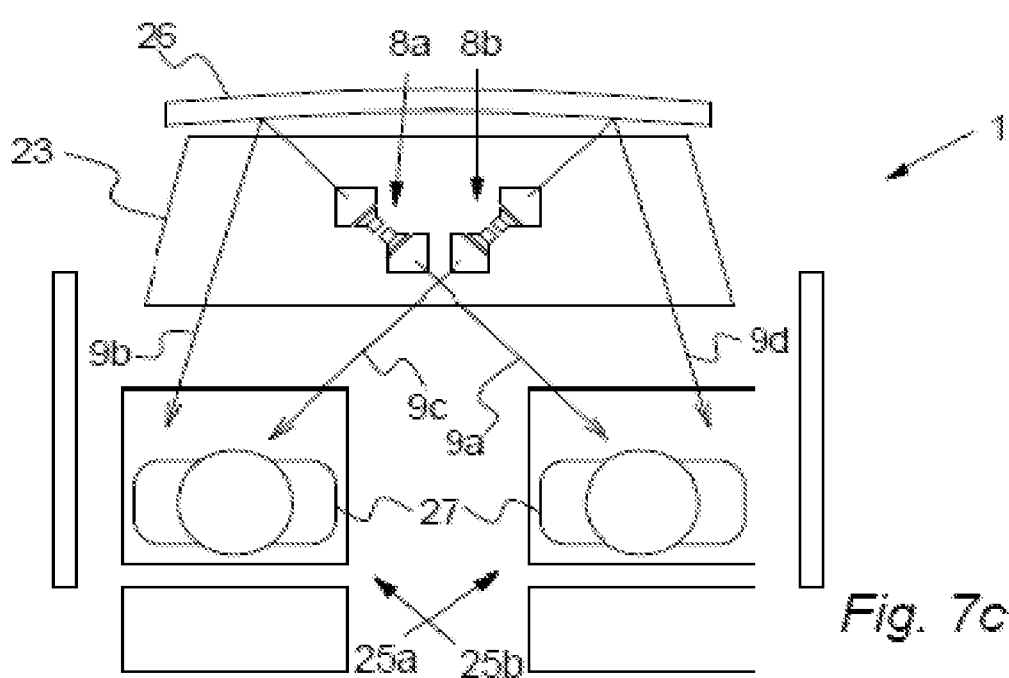

FIGS. 7a-c illustrate integration of loudspeaker pairs into a dashboard of an automobile and exemplary guiding of directional radiation patterns according to disclosed embodiments.

FIGS. 7a-b illustrate how a loudspeaker pair 8a may be integrated into a dashboard 23. FIG. 7b illustrates a top view, and FIG. 7a illustrates a cross-sectional side view, where the cross-section plane is indicated by a horizontal line in FIG. 7b. In FIG. 7b, the loudspeakers 6a, 7a are not directly visible, since they are covered by the dashboard 23, but their positions underneath the dashboard 23 are shown by dashed lines. The dashboard may for example be understood as the region under the windshield extending from the front of the driver seat to the front of the passenger seat.

In the embodiment shown if FIGS. 7a-b, the loudspeaker pair 8a is located beneath an outer surface of the dashboard 23. From here, the pair is able to generate directional radiation patterns respectively towards the left-hand side and the right-hand side of the illustration. After generation, the directional radiation patterns reach waveguides 24, which respectively redirect the two directional radiation patterns in directions which point more upwards than the directions of the directional radiation patterns upon emission from the loudspeaker pair 8a. Such redirection may be useful, as occupant ear canals are often located above the dashboard 23 of an automobile. The waveguides 24 may for example be hollow tunnels, indentations, or cavities which are each shaped to redirect audio, preferably with minimal loss.

FIG. 7c illustrates how two loudspeaker pairs 8a, 8b can be integrated in the dashboard 23 of a vehicle 1 to provide audio to occupants 27 in occupant locations 25a, 25b of that vehicle 1. Only a part of the vehicle 1 is shown in the figure.

The two loudspeaker pairs 8a, 8b may for example each be integrated into the dashboard 23 in an arrangement similar to the configuration illustrated in FIGS. 7a-b including waveguides 24.

Each of the two loudspeaker pairs 8a, 8b is arranged to generate two directional radiation patterns 9a, 9b and 9c, 9d, which in FIG. 7c are represented with arrows, for simplicity. The arrows may for example be interpreted as a propagation direction.

The first loudspeaker pair 8a generates a first backward directional radiation pattern 9a and a first forward directional radiation pattern 9b. These may initially be guided slightly upwards by waveguides. Subsequent to initial guiding, the first backward directional radiation pattern 9a arrives to an occupant 27 in a first occupant location 25a. The first forward directional radiation pattern 9b arrives at the windscreen 26 of the vehicle which acts as a sound reflection surface to reflect this radiation pattern 9b generally towards an occupant 27 in a second occupant location 25b.

In a similar manner, the second loudspeaker pair 8b generates a second backward directional radiation pattern 9c and a second forward directional radiation pattern 9d. These may initially be guided slightly upwards by waveguides. And subsequent to initial guiding, the second backward directional radiation pattern 9c arrives to the occupant 27 in the first occupant location 25b. The second forward directional radiation pattern 9d arrives at the windscreen 26 which again acts as a sound reflection surface to reflect this radiation pattern 9d towards the occupant 27 in the first occupant location 25a.

As a result of the guided directional radiation patterns, each of the two occupants receives audio signals at different loudness/strength. As indicated in the FIG. 7c, these two audio signals may even primarily arrive to in different regions, e.g. different sides, of the occupant locations 25a, 25b. As depicted, in the first occupant location 25a, the first backward audio signal 9a arrives at a left-hand side of that occupant 27/occupant location 25a, and the second forward radiation pattern 9d arrives at a right-hand side of that occupant 27/occupant location 25a.

FIG. 7c has illustrated one example of guiding directional radiation patterns to occupant locations. In other embodiments, radiation may for example be guided using further reflections, e.g., from a headliner of the automobile, from side windows, from rear windows, from glass panel roofs or from one or more surfaces dedicated for sound reflection. Radiation may further be guided using any type of waveguide with or without the use of a sound reflection surface.

Loudspeaker pairs may be located in any location of an automobile, e.g. integrated in car doors, car seats, or other parts of the interior of the car. Audio may further be guided to any occupant location, e.g., rear seats in an automobile.

Figure 7D:
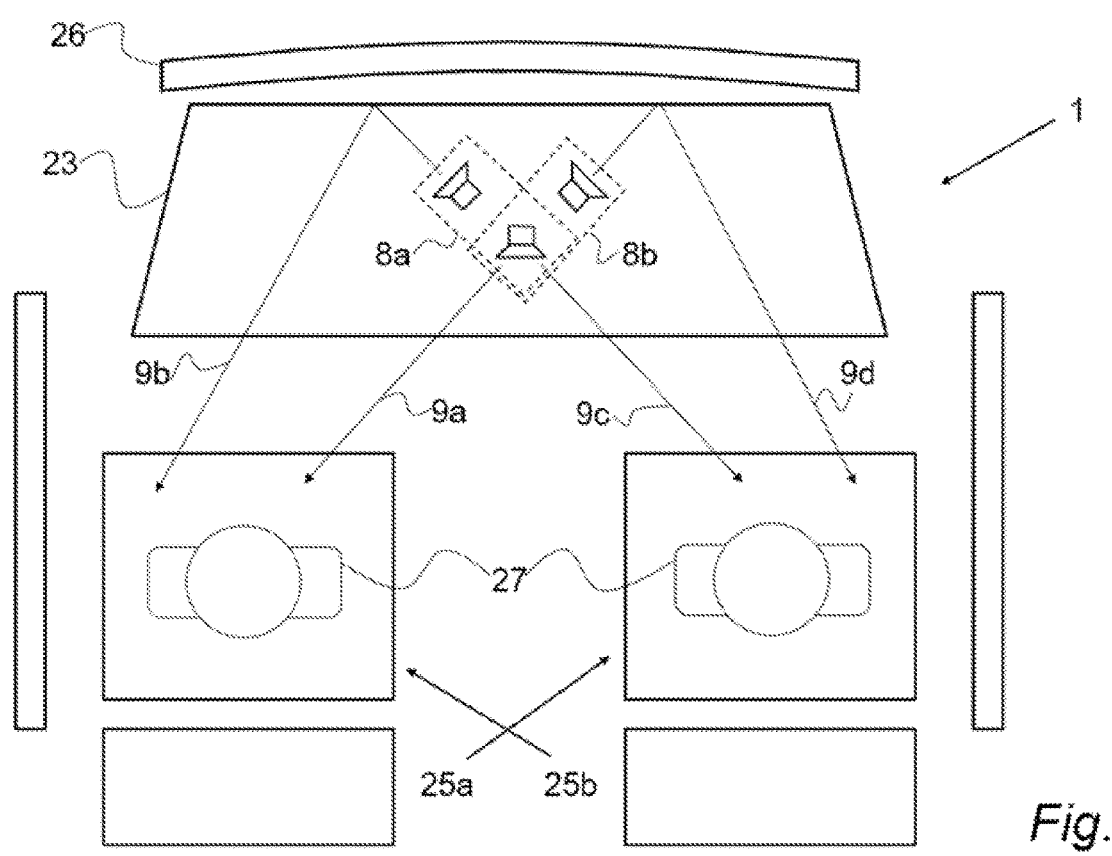

FIG. 7d illustrates a single backward loudspeaker which acts as a backward loudspeaker of both loudspeaker pairs 8a and 8b. This can be achieved by adding the signals to the rearward loudspeaker in the DSP and compensating level, delay and/or phase as needed in order to achieve the desired radiation pattern. Other operations and aspects of the configuration are similar to the configuration represented by FIG. 7c.

Figure 8A:
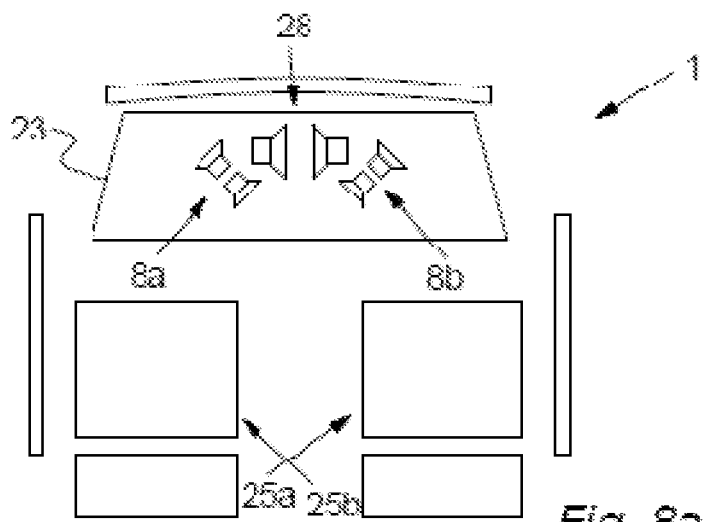
FIG. 8a-c illustrate various loudspeaker configurations in dashboards of automobiles, according to exemplary disclosed embodiments.
Figure 8B:
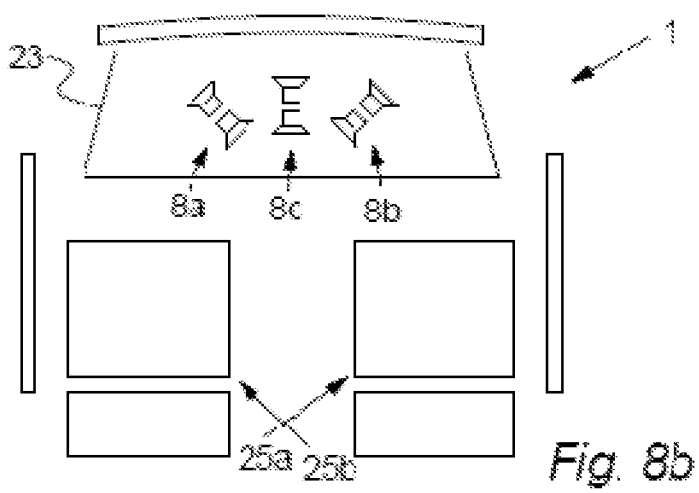
Figure 8C:
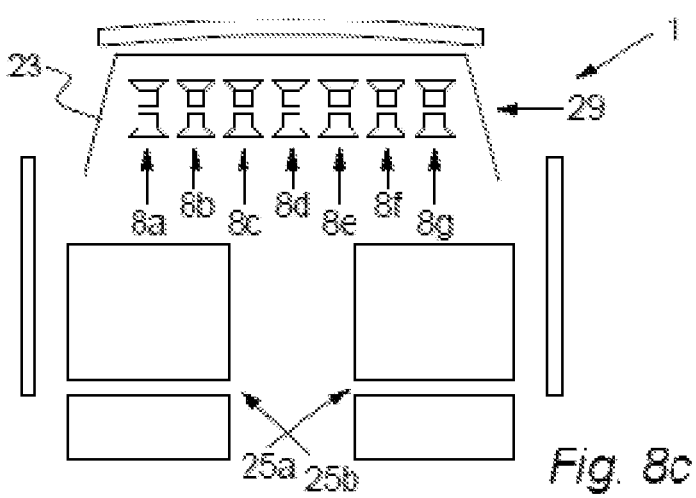

FIGS. 8a-c illustrate various other loudspeaker configurations in dashboards of automobiles according to the disclosed embodiments.

In FIG. 8a, two loudspeaker pairs 8a, 8b integrated in the dashboard 23 of a vehicle 1 are supplemented by bass loudspeakers in the form of a bass loudspeaker pair 28, also integrated in the dashboard. These bass loudspeakers may be primarily arranged to reproduce audio in the bass frequency range.

In FIG. 8b, three loudspeaker pairs 8a, 8b, 8c are integrated in the dashboard 23 of a vehicle.

In FIG. 8c, a phased loudspeaker pair array 29 comprising seven loudspeaker pairs 8a-8g is integrated in the dashboard of a vehicle.

Embodiments with higher numbers of loudspeaker pairs may be able to provide audio directionality to a larger number of occupant locations. Any number of loudspeaker pairs may be included in the disclosed embodiments depending on the requirements of a particular application.

Figure 9:
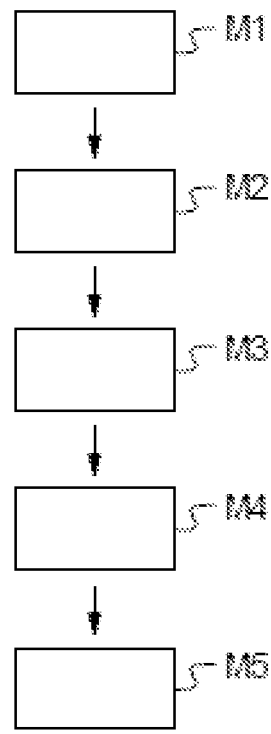
FIG. 9 illustrates method steps, according to exemplary disclosed embodiments.

FIG. 9 illustrates method steps according to exemplary disclosed embodiments. This exemplary method of the invention comprises five method steps M1-M5. More or fewer steps may be included. In some cases, certain steps may be omitted and others may be added.

In a first step M1, a plurality of audio channels comprising a first audio channel and a second audio channel are provided. The plurality of audio channels may for example be provided as part of an audio signal processing system. They may be provided directly from one or more audio sources, such as external audio sources, such as a car radio or a smartphone, or they may be provided as a part of processing audio, e.g., audio from an external source.

In a next step M2, each audio channel is processed by the audio signal system to establish a principal signal and an accommodating signal for each respective audio channel. The accommodating signal and the principal signal associated with a given audio channel may be based on that audio channel, e.g., based on an audio signal carried in that audio channel.

In a next step M3 the principal signal and the accommodating signal of the first audio channel are supplied respectively to a forward loudspeaker and a backward loudspeaker of a loudspeaker pair to generate a forward directional radiation pattern based on the first audio channel. The principal signal of the first audio channel can be supplied to the forward loudspeaker of the loudspeaker pair, and the accommodating signal of the first audio channel can be supplied to the backward loudspeaker of the loudspeaker pair.

In a next step M4, the principal signal and the accommodating signal of the second audio channel are supplied respectively to a backward loudspeaker and a forward loudspeaker of the same loudspeaker pair to generate a backward directional radiation pattern based on the second audio channel. The principal signal of the second audio channel is supplied to the backward loudspeaker of the loudspeaker pair, and the accommodating signal of the second audio channel is supplied to the forward loudspeaker of the loudspeaker pair. Although described here as two steps M3 and M4, the forward and backward directional radiation patterns can be produced at the same time, such as in parallel. However, in some embodiments, a slight delay may be applied to the forward directional radiation pattern (step M3) in embodiments relying on reflection of the backward directional radiation pattern (step M4) in, for example, the windscreen, as such delay may compensate for the difference in traveling distance of the sound.

In a step M5, the forward directional radiation pattern and the backward directional radiation pattern are guided to any of one or more locations (e.g., occupant locations) of a vehicle, e.g. an automobile in which the loudspeaker pairs are installed. Guiding may for example be understood as using any of at least one sound reflection surface and/or at least one waveguide to redirect.

Other examples of the disclosed embodiments or features associated with the disclosed embodiments are provided in the sections below.

In an embodiment of the invention, a principal signal of a first audio channel and an accommodating signal of a second audio channel are combined to constitute a driving signal of a forward loudspeaker of a loudspeaker pair and a principal signal of thr second audio channel and an accommodating signal of the first audio channel are combined to constitute a driving signal of a backward loudspeaker of the loudspeaker pair.

A loudspeaker may be arranged to receive a single driving signal, for example to be supplied to a voice coil of the loudspeaker to drive the loudspeaker. Hence, combining a principal and an accommodating signal enables these two signals to be supplied to a loudspeaker simultaneously. Consequently, both signals may be reproduced by the loudspeaker simultaneously, to participate in the generation of a forward directional radiation pattern and a backward directional radiation pattern.

In some embodiments, the two signals may for example be combined prior to being outputted from the audio signal processing system. In these embodiments, the audio processing system may thus have one audio output per loudspeaker.

In other embodiments, the signals may be combined after being outputted from the audio signal processing system.

Combining audio signals may include superimposed, added, and/or joined audio signals, and such combining may be performed using digital and/or analog techniques.

The generation of a driving signal of a loudspeaker may further include amplification, e.g. audio amplification. Such amplification is not restricted to be performed at any particular point. Audio amplification may for example be performed in the loudspeaker, in the audio signal processing system, or between the loudspeaker and the audio signal processing system. The combining of a principal signal and an accommodating signal may be performed before amplification but in other embodiments may be performed after amplification of the principal and accommodating signals.

Combining principal signals and accommodating signals to constitute a driving signal may be advantageous, as such combined signals may enable the use of standard loudspeakers with a single voice coil.

In some embodiments, a forward directional radiation pattern and a backward directional radiation pattern may have substantially opposite propagation directions, prior to said step of guiding.

When utilizing a loudspeaker pair to generate two directional radiation patterns, emitting the two directional radiation patterns in opposite directions may allow an improved separation of the signals. This may for example improve the stereo effect that these directional radiation patterns provide, or it may improve the degree to which the two directional radiation patterns can be supplied to separate occupant locations.

In some embodiments, the step of guiding any of the forward directional radiation patterns and the backward directional radiation patterns comprises redirecting any of the forward directional radiation patterns and the backward directional radiation pattern using at least one waveguide.

A waveguide may for example include a type of physical structure for guiding waves, e.g. sound waves/acoustical waves. A waveguide may have a tubular shape or canyon shape and may further include angling, arcing, bending, etc. The geometry and ends of a waveguide may be tailored to ensure efficient redirection and transmission of sound.

Redirecting may be understood as changing a propagation direction of a directional radiation pattern. An unguided directional radiation pattern may for example be associated with a particular propagation direction. Through interaction with a waveguide, however, the directional radiation pattern may be redirected such that its propagation direction is changed by at least some amount. The propagation direction may change by at least 5 degrees, for example at least 10 degrees, for example at least 15 degrees, for example at least 20 degrees, for example at least 30 degrees, for example at least 40 degrees, for example at least 50 degrees, for example at least 70 degrees, for example at least 90 degrees, for example at least 110 degrees, for example at least 130 degrees, for example at least 150 degrees, for example at least 170 degrees, etc.

Using a waveguide for redirection may improve the capability of transmitting directed audio to isolated occupant locations within a vehicle.

In an embodiment, the step of guiding any of said forward directional radiation patterns and the backward directional radiation patterns comprises redirecting the backward directional radiation patterns using a sound reflection surface. In some cases, the sound reflection surface includes a windscreen of a vehicle or a headliner (e.g., headliner material) of the vehicle, a dedicated headliner patch, etc.

A headliner may include a layered material adhered to the inside roof of an automobile. A dedicated headliner patch may for example be a plastic sheet located between a face and a back of the headliner. Such a dedicated headliner patch may be characterized by a reduced absorption of sound, compared to the surrounding headliner, where no dedicated headliner patch is present.

In some embodiments, the forward directional radiation pattern and the backward directional radiation pattern constitute a stereo sound signal which is guided to an occupant location of a vehicle. In other embodiments, two forward radiation patterns could constitute a stereo sound signal which may be guided directly or using reflections (from, for example, a windscreen) to an occupant location of a vehicle.

Due to the directionality of the radiation patterns, it may be possible to supply stereo sound to an occupant location, from a loudspeaker pair having speakers in close proximity.

In some embodiments, processing to establish the principal signal and the accommodating signal may be frequency dependent. For example, in some embodiments, a frequency-dependent relative phase shift between principal signal and accommodating signal may be applied. For example, one or more constant phase shifts may be applied in one or more a frequency bands, or a phase shift continuously changing in frequency space may be applied, e.g. in a specific band, or across certain audible frequencies. Applying a frequency-dependent phase shift may be advantageous as it may be used to account for a change in wavelength resulting from the generation of directional radiation patterns.

In some embodiments, processing to establish a principal signal and an accommodating signal may include applying a band-pass filter to each audio channel of a plurality of audio channels to establish the principal signal and the accommodating signal of for each of a plurality of audio channels. In some embodiments, such a band-pass filter may have an upper frequency limit in the range from 500 Hz to 10000 Hz, for example from 1000 Hz to 8000 Hz, for example from 2000 Hz to 6000 Hz, such as 5000 Hz.

In some embodiments, a band-pass filter may have a lower frequency limit in the range from 20 Hz to 500 Hz, for example from 30 Hz to 400 Hz, for example from 40 Hz to 300 Hz, for example from 60 Hz to 200 Hz, for example from 80 Hz to 150 Hz, for example 100 Hz. Other types of filters may be used, such as low pass filters.

Generating a directional radiation pattern may involve processing one or more frequency bands individually, as each frequency of audio may propagate uniquely inside a vehicle. For example, generating a directional radiation pattern for one tone may involve one phase shift to an accommodating signal, whereas generating a directional radiation pattern for another tone may involve a different phase shift applied to the accommodating signal. Thus, generating a radiation pattern which is directional across a broad range of frequencies may involve processing various frequencies individual, e.g. via the use of one or more band-pass filters.

In some embodiments, radiation patterns may be directional in a certain range of frequencies and non-directional in other frequencies. In some embodiments, one or more filters may be used to ensure that loudspeaker pairs do not emit substantial audio outside of a specific range of frequencies, for example in a bass frequency range. In such cases, other loudspeakers, e.g., one or more bass loudspeakers, may be used to supplement the loudspeaker pairs and reproduce audio in a bass frequency range.

In some embodiments, multiple band-pass filters can be used to isolate multiple frequency bands which can be processed individually, e.g., by implementation of individual phase shifts applied to accommodating or principal signals. Such phase shifts may be applied before or after combining of these signals with other signals.

Band-pass filters may be used at any point in the processing of audio. For example, band-pass filtering may be prior to the establishment of the principal and the accommodating signal or after the establishment of the principal and the accommodating signal.

Having two loudspeaker pairs may allow greater flexibility of distributing generated radiation patterns. A stereo sound signal supplied to an occupant may for example be composed of a radiation pattern from one loudspeaker pair, and another radiation pattern from another loudspeaker pair.

Establishing a first and a second stereo sound signal based on different speaker pairs may allow the loudspeaker pairs to provide audio at a distance from a compact region. Four directional radiation patterns may then be emitted in different directions from this compact region, wherein two are guided to one occupant location and two others are guided to another occupant location.

In some embodiments, a first stereo signal and a second stereo signal may be different. A first occupant location may include a driver sea. A stereo sound signal may comprise any of a live traffic announcement, a telecommunication message, an automobile information report, or a navigation instruction.

A live traffic announcement may for example be radio broadcasted, and indicative of traffic, for example traffic which may potentially be of relevance to navigating the vehicle. A telecommunication message may for example be provided by a telecommunication device, such as a phone, e.g. a smartphone. An automobile information report may for example be information about the vehicle provided by the vehicle itself, e.g. information relating to fuel or electrical power of the automobile. A navigation instruction may for example be based on an automotive navigation system, e.g. based on GPS, for routing and navigation. A navigation instruction may then for example instruct the driver to make a turn, change lane etc.

Audio particularly relevant to a driver (e.g., navigation instructions, traffic reports, etc.) may be delivered primarily to the driver seat location in a vehicle, while other audio signals may be featured at other locations with the vehicle.

In some embodiments, supplying a principal signal and an accommodating signal of a first audio channel may be time shifted relative to supplying a principal signal and an accommodating signal of a different audio channel.

A time shift, such as a time delay, may for example be at least 0.1 milliseconds, for example at least 0.2 milliseconds, for example at least 0.5 milliseconds, for example at least 1 millisecond, for example at least 1.5 milliseconds, such as at least 2 milliseconds, etc.

A time shift may for example be introduced to account for a difference in travelling distance experienced by two different directional radiation patterns constituting a stereo signal as those patterns travel to an occupant location. One of the directional radiation patterns may for example travel via an indirect route which includes a reflection, whereas another directional radiation pattern may travel via a direct route without reflection. The amount of delay or time shift applied to the most direct signal may be selected to compensate for this difference in traveling distance between a direct route and an indirect route taking into account the speed of sound in air. For example, a delay of 2 ms may compensate for a difference in traveling distance of approx. 0.002*343=0.686 m, and a delay of 0.5 ms may compensate for a difference of approx. 0.000,5*343=0.172 m, at 20° C. in dry air.

Shifting the principal and the accommodating signal of an audio channel may improve the audio quality of a stereo signal at an occupant location.

In some embodiments, said forward directional radiation pattern and said backward directional radiation pattern are directional for frequencies in a range from 100 Hz to 4000 Hz, for example from 1000 Hz to 4000 Hz, for example from 1500 Hz to 3000 Hz, such as at 2000 Hz.

A directional radiation pattern may have a varying directionality or a varying pattern with varying frequency. Thus, in some embodiments of the invention, a radiation pattern may only be directional in a particular range of frequencies. Radiation patterns being directional in a restricted range of frequencies may facilitate implementation.

In some embodiments, the radiation pattern may have a varying directionality across various frequencies. Whether a radiation pattern is directional may then, for example, be determined by frequency integration of the radiation pattern. The frequency integration may for example be performed across certain audible frequencies, in the above-mentioned frequency ranges, or in a frequency range of an associated band-pass filter. In some cases, a multi-frequency radiation pattern may be considered directional if the integrated radiation pattern is directional.

In some embodiments, a forward intensity of a forward directional radiation pattern may be greater than a backward intensity of a forward directional radiation pattern by at least a predetermined intensity difference. In some embodiments, this intensity difference may be at least 3 dB, for example at least 5 dB, for example at least 10 dB, for example at least 15 dB, for example at least 20 dB, for example at least 25 dB, such as 30 dB.

A forward intensity may for example be an intensity of the forward directional radiation pattern in a loudspeaker direction, in a propagation direction of the radiation pattern, or a peak intensity of the forward directional radiation pattern. A backward intensity may for example be the intensity of the forward directional radiation pattern in a diametrically opposite direction relative to the direction associated with the forward intensity.

In an embodiment of the invention, an integrated forward intensity of a forward directional radiation pattern may be greater than an integrated backward intensity of said forward directional radiation pattern by at least an integrated intensity difference. In an embodiment of the invention, the integrated intensity difference is at least 2 dB, for example at least 3 dB, for example at least 5 dB, for example at least 7 dB, for example at least 10 dB, for example at least 15 dB, such as 20 dB.

An integrated forward intensity may for example be based on a spherical integration of half of the forward directional radiation pattern. The half of the sphere to be integrated may for example be based on a propagation direction of the forward directional radiation pattern or a peak intensity of the forward directional radiation pattern. Either of these may provide a point on a sphere, and the half of the sphere to be integrated may for example be the half which is closest to that point. The integrated backward intensity may then be based on integration of the other half.

Having an intensity difference or an integrated intensity difference may promote a large degree of directionality of the forward directional radiation pattern.

An intensity difference or an integrated intensity difference may as well apply to a backward directional radiation pattern, a second forward directional radiation pattern, and/or a second backward directional radiation pattern, etc. In these cases, the direction of forward/backward intensity and integrated forward/backward intensity may for example be based on peak intensities or propagation direction of a particular radiation pattern.

In some embodiments, the audio apparatus is integrated with a dashboard. In other cases, the audio apparatus may be separate from the dashboard. It may for example be a stand-alone unit or integrated in other parts of the vehicle.

In some embodiments, a forward loudspeaker and a backward loudspeaker of each loudspeaker pair may have different loudspeaker directions with a relative loudspeaker angle of at least 60 degrees, such as at least 90 degrees, such as at least 110 degrees, such as at least 120 degrees, such as at least 130 degrees, such as at least 150 degrees, such as at least 170 degrees.

A loudspeaker may have a loudspeaker direction, e.g. defined by an axis in which a voice coil of the loudspeaker is arranged to move along upon receiving a driving signal. The loudspeaker direction may for example be defined by this axis in combination and point in the direction of a diaphragm of the loudspeaker, relative to the location of the voice coil. The two loudspeakers of a loudspeaker pair may for example have substantially opposite loudspeaker directions.

Having different loudspeaker directions may improve the directionality of the directional radiation patterns of the loudspeakers.

Waveguides can be used for guiding forward directional radiation patterns and backward directional radiation patterns. Utilizing waveguides may improve the capability of transmitting directed audio to isolated occupant locations. Waveguides may for example be a part of a stand-alone personalized audio apparatus, or they may be integrated into the interior of the vehicle, e.g. together with the audio apparatus into the dashboard of an automobile.

In some embodiments, a first loudspeaker pair and a second loudspeaker pair of one or more loudspeaker pairs may be angled by a loudspeaker pair angle, wherein the loudspeaker pair angle is at least 10 degrees, for example at least 20 degrees, for example at least 30 degrees, for example at least 40 degrees, for example at least 50 degrees, for example at least 60 degrees, for example at least 70 degrees, for example at least 80 degrees, for example at least 90 degrees.

Angling a first loudspeaker pair and a second loudspeaker pair by a loudspeaker pair angle may enable distributing audio, e.g. stereo audio, to multiple occupant locations.

Each loudspeaker pair may have a loudspeaker pair axis including a straight line through the diaphragm centers of the two loudspeakers of the loudspeaker pair. The loudspeaker pair angle may for example be determined by measuring the angle between loudspeaker pair axes of the loudspeaker pairs. A diaphragm center may be understood as a central point of a diaphragm of a loudspeaker. For example, the center may correspond with a point of approximate symmetry, a geometric center, etc.

In some embodiments, a distance between a backside of a forward loudspeaker and a backside of a backward loudspeaker of each of one or more loudspeaker pairs is less than 50 centimeters, for example less than 40 centimeters, for example less than 30 centimeters, for example less than 20 centimeters, such as less than 10 centimeters. A backside of a loudspeaker may for example be a backside of a casing of the loudspeaker, of a backside of a pole piece of a magnetic circuit of the loudspeaker. Such a pole piece may also be referred to as a bottom plate, a back-plate pole, or simply a pole. The pole piece relevant for measuring distances between two loudspeakers may typically be the pole piece furthest from the diaphragm, and the distance may for example be measured from the surface of the pole piece furthest away from the diaphragm.

Locating loudspeakers closely together by bringing together the backsides of the loudspeakers may allow for a compact design of a personalized audio apparatus.

In some embodiments, a distance between a diaphragm center of a forward loudspeaker and a diaphragm center of a backward loudspeaker of each of one or more loudspeaker pairs is less than 60 centimeters, for example less than 50 centimeters, for example less than 40 centimeters, for example less than 30 centimeters, for example less than 20 centimeters, such as less than 10 centimeters. Locating the loudspeakers closely together by reducing a distance between diaphragm centers of the loudspeakers may allow a compact design of the audio apparatus.

In some embodiments, one or more loudspeaker pairs may include at least two loudspeaker pairs, for example at least three loudspeaker pairs, for example at least four loudspeaker pairs, for example at least five loudspeaker pairs, such as at least six loudspeaker pairs, etc. The use of multiple loudspeaker pairs may offer improved audio for occupants in a vehicle, e.g. through implementation of stereo or surround sound, and/or may allow directed and/or immersive audio for a greater number of occupants in the vehicles.

In some embodiments, one or more loudspeaker pairs may include a phased loudspeaker pair array, wherein forward directional radiation patterns of separate loudspeaker pairs of the phased loudspeaker pair array may be phase shifted by different amounts. In some cases, backward directional radiation patterns of separate loudspeaker pairs of the phased loudspeaker pair array may be phase shifted by different amounts.

A phased array of loudspeaker pairs may for example be aligned in a row. One isolated loudspeaker pair of the array may emit sound which is substantially similar to another isolated loudspeaker pair of the array, but a controlled phase shift between the sounds may yield improved control of directionality. The directionality may be based on the phase shift between the radiation patterns. Controlling the phase shift of multiple loudspeaker pairs of a phased loudspeaker pair array may enable radiation patterns to be focused toward a specific area or a specific direction.

In some embodiments, the audio apparatus comprises at least one bass loudspeaker arranged to generate a bass radiation pattern. A bass loudspeaker may for example emit sound in the bass frequency range, e.g. below 250 Hz. A driving signal supplied to a bass loudspeaker may for example be based on a low-pass filter. Control of directionality may be more difficult in the bass frequency range, due to the longer wavelength. Thus, having at least one dedicated bass loudspeaker may enable the loudspeaker pairs to be dedicated for generation of directional sound. In some cases, the described audio apparatus may include two bass loudspeakers, for example configured as a bass loudspeaker pair.

It should be noted that a typical loudspeaker may have an approximately isotropic radiation pattern. That is, at a fixed distance in the far-field regime of the loudspeaker, the radiation intensity from the loudspeaker does not vary much when changing the relative direction to the loudspeaker. In contrast to this, two loudspeakers may receive matching driving signals, e.g. a principal and an accommodating signal, to generate a non-isotropic radiation pattern, e.g. a directional radiation pattern. An example of a non-isotropic radiation pattern is a cardioid radiation pattern. A directional radiation pattern may for example be characterized by a propagation direction.

The propagation direction may for example be quantified by a weighted average of radiation intensity across all solid angles relative to a loudspeaker or a loudspeaker pair. Near-field and far-field regimes may for example be quantified by wavelength or diaphragm diameter. The transition may for example lie from 0.5 to 10 units of wavelength or diaphragm diameter, such as at 2, 3, 4, 5 or 6 units. For example, at a well-defined frequency, such as a frequency from 100 Hz to 10000 Hz, such as 2000 Hz. In cases of loudspeaker pairs, directionality may be quantified in regions which are in the far-field of both loudspeakers.

The propagation direction may also be quantified by a maximum radiation intensity or by the orientation of the loudspeakers. For example, more radiation may be emitted in a direction in which one loudspeaker of the loudspeaker pair is facing, as compared to a direction in which the other loudspeaker of the loudspeaker pair is facing. Then the direction in which the one loudspeaker is facing may for example be considered the propagation direction of the directional radiation pattern. The propagation direction of a directional radiation pattern from a loudspeaker pair may for example be characterized without the presence of waveguides or other objects which influence a radiation pattern. After generation of the directional radiation pattern, the directional radiation pattern may be redirected by a waveguide or a reflection, e.g. as a part of guiding audio to an occupant or an occupant location.

A radiation pattern may for example be considered directional when its intensity in one solid angle is greater than its intensity in another solid angle, e.g. measured at a specific frequency in the far-field, for example an audible frequency such as 2000 Hz. For example, when one intensity is more than 10 dB greater.

An audio signal processing system may include a single audio signal processor, or it may include a plurality of audio signal processors. For example, an audio signal processor may be associated with each loudspeaker or each of the cardioid loudspeaker pairs. Audio signal processors may for example be digital signal processors.

The described audio signal processing systems may be arranged to receive audio from any kind of audio source, for example from a car radio, a telecommunication device, an audio player, etc. The audio signal processing systems may receive audio through a wired connection or a wireless connection, such as Bluetooth, for example a Bluetooth connection for receiving audio from a smartphone. An audio signal processing system may receive audio from multiple sources simultaneously, and the sources of the audio are not restricted to either mono or stereo sound. The audio from multiple audio sources may then be distributed automatically or manually to the different audio channels, such that different directional radiation patterns can be generated based on audio from the audio sources. In this way, separate occupants may receive audio at different audio volumes. A single occupant may further receive audio from several sources, for example to listen to music while performing telecommunication or receiving a live traffic announcement/traffic report, e.g. facilitated by a radio system.

The signal or signals in an audio channel may be used as the basis for a directional radiation pattern. Each directional radiation pattern generated may have an associated audio channel, and each audio channel may provide the basis for a principal signal and an accommodating signal, which in turn may provide the basis for the directional radiation pattern of a particular audio channel. In case a stereo signal is to be supplied to an occupant, the at least two audio signals of the stereo signal may for example be provided through different audio channels. The signal of an audio channel may provide the basis for an accommodating signal and a principal signal, which are supplied respectively to separate loudspeakers of a loudspeaker pair. To generate two directional radiation patterns, a loudspeaker pair can receive two principal signals and two accommodating signals, such that each loudspeaker receives a principal and an accommodating signal from separate audio channels. An accommodating signal from one audio channel and a principal signal from a different audio channel supplied to a loudspeaker may be added or superimposed, and the resulting signal may for example serve as a driving signal for that loudspeaker or basis for a driving signal for that loudspeaker. Any signals supplied to a loudspeaker may or may not be amplified, e.g. through an audio amplifier.

A loudspeaker pair may be understood as a pair of loudspeakers which are arranged to generate a directional radiation pattern upon receiving a principal signal and an accommodating signal of an audio channel. They may be located next to each other, e.g. facing opposite directions, but the loudspeaker pairs are not restricted to such a configuration. The principal signal and the accommodating signal of an audio channel are both based on a particular audio channel. Consequently, the principal signal and accommodating signal of an audio channel may be similar with a primary difference being a phase shift between the signals. Such a phase shift may for example ensure constructive interference in one direction of a radiation pattern of a loudspeaker pair and destructive interference in another direction of that loudspeaker pair, thus establishing a directional radiation pattern. Accordingly, the phase shift may be arranged to match a certain wavelength and/or a certain distance between the loudspeakers of the loudspeaker pair. The accommodating signal may be generated based on delaying or phase shifting the principal signal or vice versa but generation of the accommodating signal and the principal signal is not restricted to a particular technique. Other processing elements useful in generating principal signals and accommodating signals may include signal inverters, band-pass filters, and/or low-pass filters. In some embodiments, several frequency bands of an audio channel may be processed independently to generate the principal signal and the accommodating signal. Each frequency band may be isolated using one or more frequency filters, and each frequency band may be subjected to a phase shift/delay to ensure a directional radiation pattern in a particular frequency band. A single loudspeaker may be used in more than one loudspeaker pair. For example, one loudspeaker may be used to reproduce the principal signal or accommodating signal for any number of channels allowing the possibility for fewer loudspeakers to be used when creating a plurality of radiation patterns. For example, two or more loudspeaker pairs may have a loudspeaker in common.

The disclosed embodiments relate to audio in vehicles and may include one or more pairs of loudspeakers, each pair arranged to generate directional radiation patterns to be guided to occupant locations in the vehicle. The generation of the directional radiation patterns may be based on the establishment of a principal signal and an accommodating signal by an audio signal processing system. Upon delivery of these two signals to a loudspeaker pair, the pair may generate directional audio based on the principles of destructive and constructive interference. By supplying each loudspeaker of a pair with separate accommodating and principal signals, it is possible to generate two directional radiation patterns in different directions. The disclosed embodiments may allow for a compact audio apparatus to provide improved audio to one or more occupants of a vehicle at a distance, which may be immersive and/or directional.

The techniques and apparatus described herein can give a listener an impression that sound is coming from different areas within the vehicle, which contributes to an immersive audio experience. Such an experience may be provided, for example, using arrays to reflect sound off the windscreen to provide a diffuse sound, or reflecting sound off different areas in the vehicle and using these as surround audio sources to generate an impression of a 3D audio environment. Audio can be directed at occupant locations such that certain audio channels or signals may be louder to a listener at one location versus another location (although in many cases, directional audio may not be completely screened from other occupants, as the inside of a vehicle is a reflective environment).

The systems and methods described above are presented in no particular order and can be performed in any order or in any combination. For example, various embodiments of the audio apparatus may include a combination of all of the features and functionality described above, or in some cases, the audio apparatus may offer any subset of described features and/or functionality.

It will be understood from the foregoing description that modifications and changes may be made in various embodiments without departing from scope of the invention described in this specification. The descriptions in this specification are for purposes of illustration only and are not to be construed in a limiting sense. The scope of the present invention is limited only by the language of the following claims.

The invention claimed is:

1. A method for providing audio in a vehicle, said method comprising the steps of:
providing a plurality of audio channels comprising a first audio channel and a second audio channel;
processing, by an audio signal processing system, each audio channel of said plurality of audio channels to establish a principal signal and an accommodating signal for each audio channel of said plurality of audio channels;
supplying said principal signal of said first audio channel to a forward loudspeaker of a first loudspeaker pair and supplying said accommodating signal of said first audio channel to a backward loudspeaker of said first loudspeaker pair to generate a forward directional radiation pattern based on said first audio channel and having a forward propagation direction, wherein said first loudspeaker pair is installed in a dashboard in said vehicle and said first loudspeaker pair is disposed among a first occupant location, a second occupant location, and a sound reflection surface in said vehicle, and said first occupant position and said second occupant position are located on the left and right sides of said vehicle respectively;
supplying said principal signal of said second audio channel to said backward loudspeaker of said first loudspeaker pair and supplying said accommodating signal of said second audio channel to said forward loudspeaker of said first loudspeaker pair to generate a backward directional radiation pattern based on said second audio channel and having a backward propagation direction, wherein said backward loudspeaker of said first loudspeaker pair faces backward and faces to said second occupant position and said forward loudspeaker of said first loudspeaker pair faces forward and faces to said sound reflection surface in said vehicle, and forward is opposite to backward, wherein said forward loudspeaker of said first loudspeaker pair receives both said principal signal of said first audio channel and said accommodating signal of said second audio channel, and said backward loudspeaker of said first loudspeaker pair receives both said accommodating signal of said first audio channel and said principal signal of said second audio channel; and
guiding said forward directional radiation pattern to a first occupant location via said sound reflection surface in said vehicle, wherein and said backward directional radiation pattern directly arrives to said second occupant location in said vehicle.

2. The method according to claim 1, wherein
for each audio channel of said plurality of audio channels, the accommodating signal is generated by applying a delay, signal inversion, and/or low pass filtering to the principal signal.

3. The method according to claim 1, wherein
said principal signal of said first audio channel and said accommodating signal of said second audio channel are combined to provide a driving signal of said forward loudspeaker of said loudspeaker pair and said principal signal of said second audio channel and said accommodating signal of said first audio channel are combined to provide a driving signal of said backward loudspeaker of said loudspeaker pair.

4. The method according to claim 1, wherein, prior to guiding, said forward directional radiation pattern and said backward directional radiation pattern have substantially opposite propagation directions.

5. The method according to claim 1, wherein
said guiding of one or both of said forward directional radiation pattern and said backward directional radiation pattern comprises redirecting either or both of said forward directional radiation pattern and said backward directional radiation pattern via at least one waveguide.

6. The method according to claim 1, wherein
said step of guiding one or both of said forward directional radiation pattern and said backward directional radiation pattern includes redirecting either or both of the forward or backward directional radiation pattern using a said sound reflection surface.

7. The method according to claim 6, wherein
said sound reflection surface includes an internal surface of a vehicle.

8. The method according to claim 7, wherein
the internal surface of the vehicle includes a windscreen or a headliner material.

9. The method according to claim 1, wherein
said forward directional radiation pattern and said backward directional radiation pattern include a stereo sound signal which is guided to the one or more locations.

10. The method according to claim 1, wherein,
for each audio channel of said plurality of audio channels, the processing to establish said principal signal and said accommodating signal is frequency dependent.

11. The method according to claim 1, wherein
said loudspeaker pair is a first loudspeaker pair, wherein said forward directional radiation pattern is a first forward directional radiation pattern, wherein said backward directional radiation pattern is a first backward directional radiation pattern; and
wherein said plurality of audio channels further comprises a third audio channel and a fourth audio channel;
wherein said method further comprises the steps of:
supplying a principal signal of said third audio channel to a forward loudspeaker of a second loudspeaker pair and supplying an accommodating signal of said third audio channel to a backward loudspeaker of the second loudspeaker pair to generate a second forward directional radiation pattern based on said third audio channel; and
supplying said principal signal of said fourth audio channel to said backward loudspeaker of said second loudspeaker pair and supplying said accommodating signal of said fourth audio channel to said forward loudspeaker of said second loudspeaker pair to generate a second backward directional radiation pattern based on said fourth audio channel;
wherein said step of guiding further comprises guiding one or both of said second forward directional radiation pattern and said second backward directional radiation pattern to one or more locations in said vehicle.

12. The method according to claim 11, wherein
said first forward directional radiation pattern and said second backward directional radiation pattern include a first stereo sound signal which is guided to a first location, and wherein said second forward directional radiation pattern and said first backward directional radiation pattern include a second stereo sound signal which is guided to a second location.

13. The method according to claim 12, wherein
said first stereo signal and said second stereo signal are different.

14. The method according to claim 11, wherein
said first forward directional radiation pattern and said second forward directional radiation pattern include a first stereo sound signal which is guided to one or more first locations, and wherein said first backward directional radiation pattern and said second backward directional radiation pattern include a second stereo sound signal which is guided to one or more second locations.

15. The method according to claim 11, wherein
said first forward directional radiation pattern and said second forward directional radiation pattern include a first stereo sound signal which is guided to multiple locations, and wherein said first backward directional radiation pattern and said second backward directional radiation pattern include a second stereo sound signal which is guided to multiple locations.

16. The method according to claim 11, wherein
said step of guiding includes redirecting said forward directional radiation pattern or said backward directional radiation pattern using a sound reflection surface.

17. The method according to claim 16, wherein
the sound reflection surface includes an internal surface of a vehicle.

18. The method according to claim 17, wherein
the internal surface of the vehicle includes a windscreen or headliner material.

19. The method according to claim 1, wherein
said one or more locations include a driver or passenger seat in the vehicle.

20. The method according to claim 9, wherein
said stereo signal comprises any of a live traffic announcement, a telecommunication message, an automobile information report, a music audio signal, and a navigation instruction.

21. The method according to claim 11, wherein
the supplying of said principal signal and said accommodating signal of said first audio channel is shifted by a time shift relative to the supplying of said principal signal and said accommodating signal of said fourth audio channel.

22. An audio apparatus for a vehicle, said audio apparatus comprising:
an audio signal processing system arranged to process a plurality of audio channels and establish a principal signal and an accommodating signal for each of the plurality of audio channels;
one or more loudspeaker pairs, wherein each of the one or more loudspeaker pairs includes a forward loudspeaker and a backward loudspeaker, and wherein each of said one or more loudspeaker pairs is configured to be communicatively coupled to two respective audio channels among said plurality of audio channels, wherein for a first loudspeaker pair of said loudspeaker pairs:
said forward loudspeaker of said first loudspeaker pair is both coupled to said principal signal of a first of said two respective audio channels and coupled to said accommodating signal of a second of said two respective audio channels, wherein said first loudspeaker pair is installed in a dashboard in said vehicle and said first loudspeaker pair is disposed among a first occupant location, a second occupant location, and a sound reflection surface in said vehicle, and said first occupant position and said second occupant position are located on the left and right sides of said vehicle respectively, and
said backward loudspeaker of said first loudspeaker pair is both coupled to said principal signal of said second of said two respective audio channels and coupled to said accommodating signal of said first of said two respective audio channels, wherein said backward loudspeaker faces backward and faces to said second occupant position, and said forward loudspeaker faces forward and faces to said sound reflection surface in said vehicle, and forward is opposite to backward;
such that said first loudspeaker pair simultaneously generates a forward directional radiation pattern based on said first of said two respective audio channels and having a forward propagation direction, and a backward directional radiation pattern based on said second of said two respective audio channels and having a backward propagation direction, wherein said forward directional radiation pattern is guided to a first occupant location via said sound reflection surface in said vehicle, and said backward directional radiation pattern directly arrives to said second occupant location.

23. The audio apparatus according to claim 22, wherein said audio apparatus is integrated in a dashboard of said vehicle.

24. The audio apparatus according to claim 22, wherein, for each of the plurality of audio channels, the audio signal processing system is arranged to generate the accommodating signal by applying a delay, signal inversion, and/or low pass filtering to the primary signal.

25. The audio apparatus according to claim 22, wherein said one or more loudspeaker pairs include a first loudspeaker pair and a second loudspeaker pair angled by a loudspeaker pair angle, wherein said loudspeaker pair angle is at least 10 degrees.

26. The audio apparatus according to claim 22, wherein, for each of said one or more loudspeaker pairs, a distance between a backside of said forward loudspeaker and a backside of said backward loudspeaker is less than 50 centimeters.

27. The audio apparatus according to claim 22, wherein, for each of said one or more loudspeaker pairs, a distance between a diaphragm center of said forward loudspeaker and a diaphragm center of said backward loudspeaker is less than 60 centimeters.

28. The audio apparatus according to claim 22, wherein said one or more loudspeaker pairs comprise a phased loudspeaker pair array, wherein said forward directional radiation patterns of separate loudspeaker pairs of said phased loudspeaker pair array have different phase shifts.

29. The audio apparatus according to claim 22, wherein said audio apparatus further comprises at least one bass loudspeaker.

30. The audio apparatus according to claim 22, wherein at least one backward loudspeaker included in the one or more loudspeaker pairs is paired with at least two forward loudspeakers.

31. A vehicle comprising the audio apparatus of claim 22.

* * * * *